(12) United States Patent
Elshafie et al.

(10) Patent No.: US 12,513,704 B2
(45) Date of Patent: Dec. 30, 2025

(54) MANAGING SIGNALS ON MULTIPLE WIRELESS LINKS

(71) Applicant: QUALCOMM Incorporated, San Diego, CA (US)

(72) Inventors: Ahmed Elshafie, San Diego, CA (US); Diana Maamari, San Diego, CA (US); Huilin Xu, Temecula, CA (US); Ahmed Attia Abotabl, San Diego, CA (US); Marwen Zorgui, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 535 days.

(21) Appl. No.: 17/935,080

(22) Filed: Sep. 23, 2022

(65) Prior Publication Data

US 2024/0107543 A1 Mar. 28, 2024

(51) Int. Cl.
*H04W 72/23* (2023.01)
*H04W 72/20* (2023.01)
*H04W 92/18* (2009.01)

(52) U.S. Cl.
CPC ........... *H04W 72/23* (2023.01); *H04W 72/20* (2023.01); *H04W 92/18* (2013.01)

(58) Field of Classification Search
CPC ....... G06F 8/71; G06F 9/44505; H04B 7/063; H04B 7/0634; H04B 7/0639; H04L 41/08; H04L 41/0806; H04L 41/0823; H04L 41/0836; H04L 41/0853; H04L 41/0895; H04L 41/16; H04L 43/087; H04L 67/34; H04W 52/146; H04W 52/247; H04W 52/383; H04W 72/20; H04W 72/23–232; H04W 72/25; H04W 76/14; H04W 76/23; H04W 88/04; H04W 92/18; H04W 52/242; H04W 72/27; H04W 72/29; Y02D 30/70
See application file for complete search history.

(56) References Cited

U.S. PATENT DOCUMENTS

| 11,265,824 B2 * | 3/2022 | Bala ...................... H04L 5/0005 |
| 2012/0039269 A1 * | 2/2012 | Tenny ................... H04L 5/0042 370/329 |
| 2021/0051653 A1 | 2/2021 | Park et al. |
| 2021/0297964 A1 * | 9/2021 | Hosseini ............... H04W 76/10 |
| 2022/0210744 A1 | 6/2022 | Ren et al. |
| 2023/0171843 A1 * | 6/2023 | Luo ....................... H04W 76/14 370/310 |

FOREIGN PATENT DOCUMENTS

WO 2021091340 A1 5/2021

OTHER PUBLICATIONS

International Search Report and Written Opinion—PCT/US2023/032430—ISA/EPO—Jan. 3, 2024.

* cited by examiner

*Primary Examiner* — Thomas R Cairns
(74) *Attorney, Agent, or Firm* — Procopio, Cory, Hargreaves & Savitch LLP

(57) ABSTRACT

A method for wireless communication at a first user equipment (UE) and related apparatus are provided. In the method, the first UE communicates with one or more UEs over sidelink (SL). The first UE further transmits or receives configuration information for SL communication with the one or more UEs or uplink communication with a network entity. The method improves the reliability of wireless communication, particularly in XR-related applications, and facilitates the power transfers of energy harvesting UEs.

32 Claims, 14 Drawing Sheets

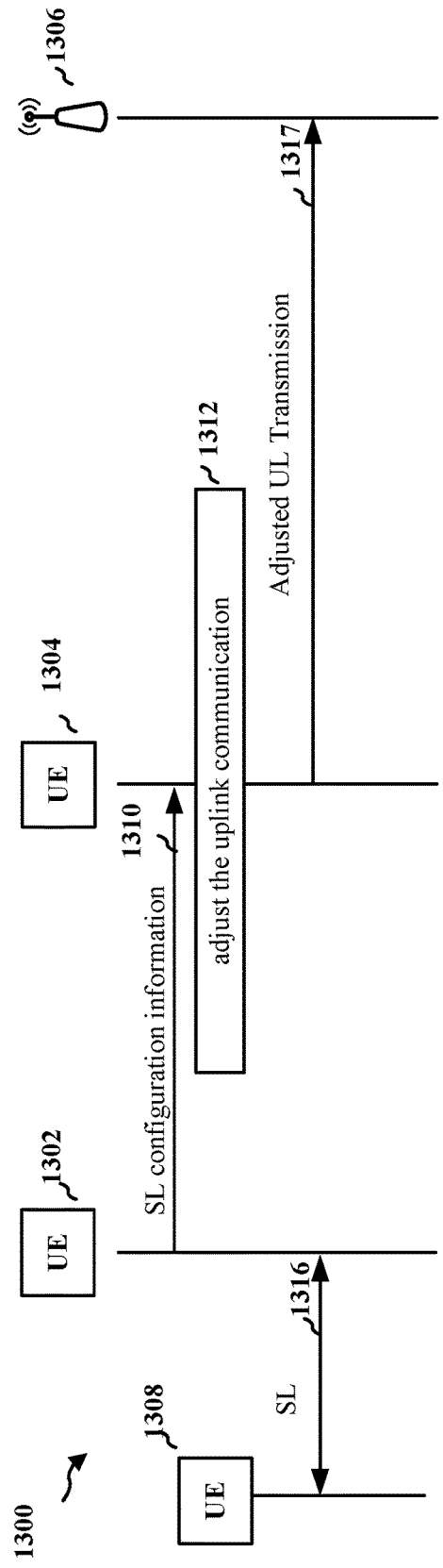
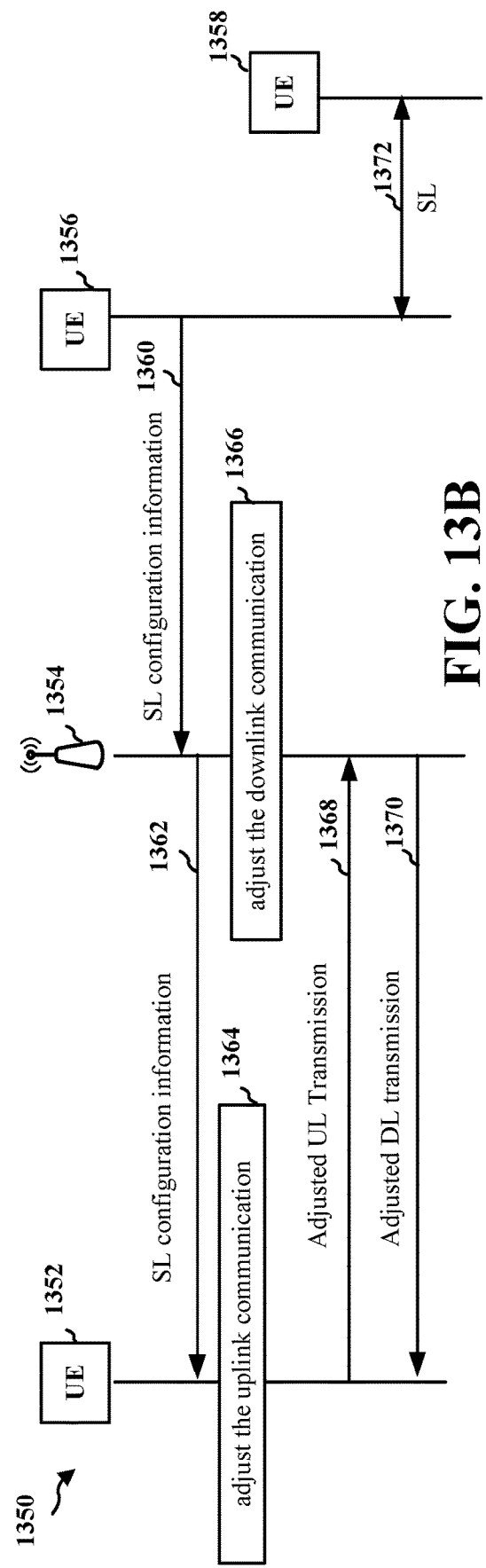
FIG. 13A
FIG. 13B

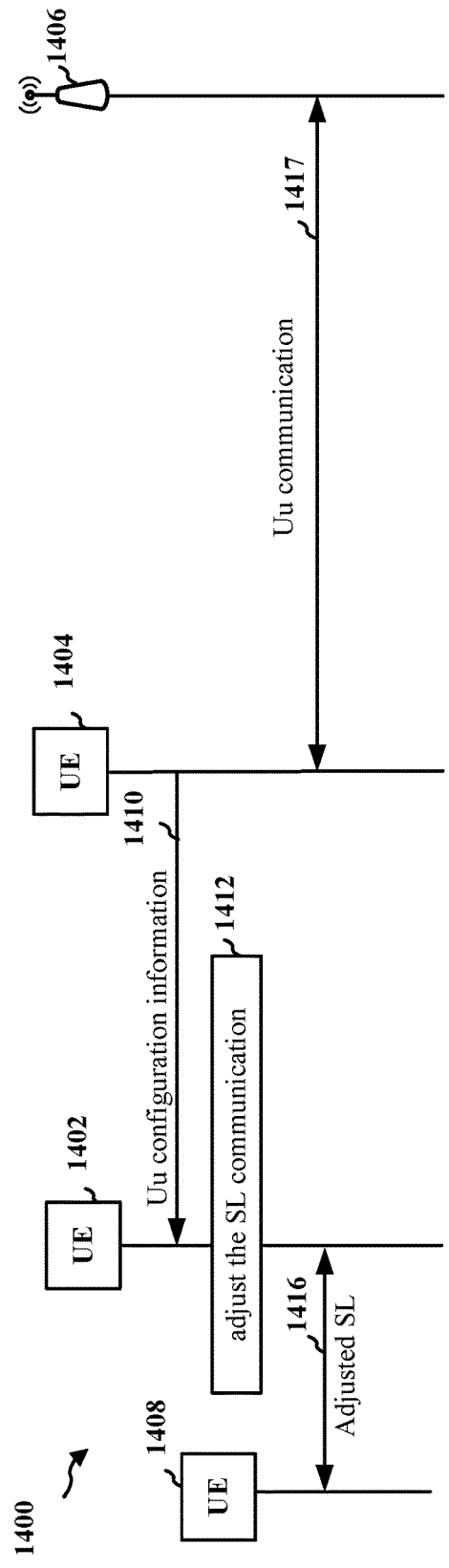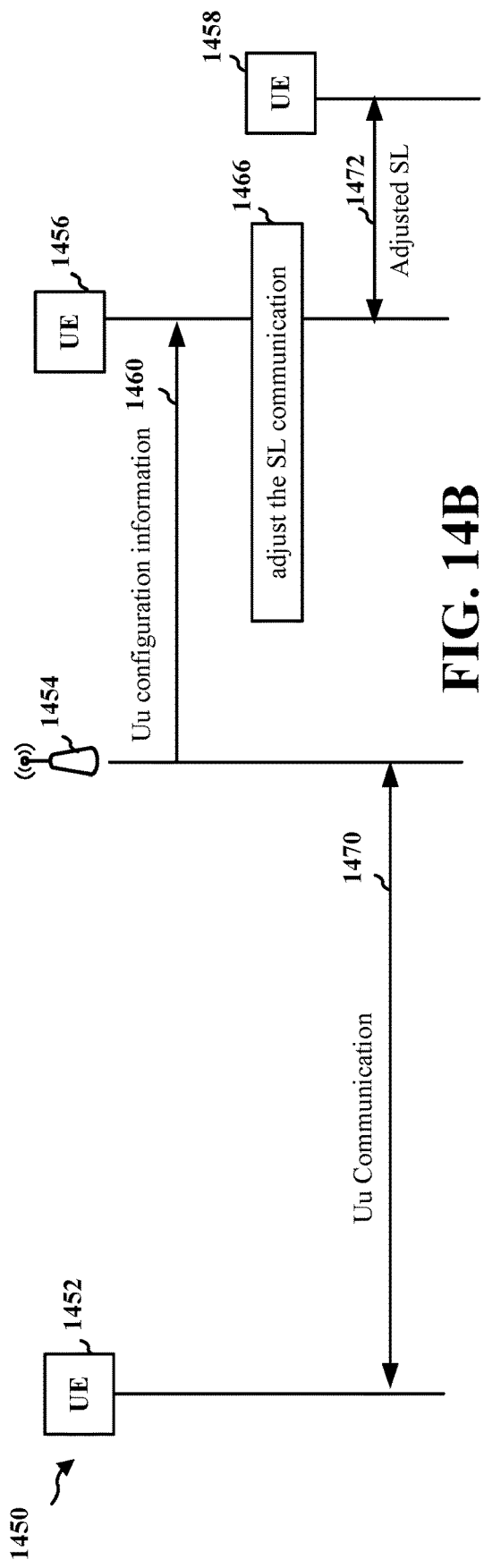
FIG. 14A
FIG. 14B

MANAGING SIGNALS ON MULTIPLE WIRELESS LINKS

TECHNICAL FIELD

The present disclosure relates generally to communication systems, and more particularly, to wireless communication including signal management on multiple wireless links.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include a memory and at least one processor coupled to the memory. Based at least in part on information stored in the memory, the at least one processor may be configured to communicate with one or more UEs over side link (SL). The at least one processor may be further configured to transmit or receive configuration information for SL communication with the one or more UEs or uplink communication with a network entity.

In an aspect of the disclosure, a method, a computer-readable medium, and an apparatus are provided for wireless communication at a network entity. The apparatus may include a memory and at least one processor coupled to the memory. Based at least in part on information stored in the memory, the at least one processor may be configured to receive configuration information for SL communication of a first UE. The at least one processor may be further configured to provide the configuration information for the SL communication of the first UE to a second UE with which the network entity communicates over an access link.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 13A and FIG. 13B are communication flow diagrams illustrating methods of wireless communication in accordance with various aspects of the present disclosure.

FIG. 14A and FIG. 14B are communication flow diagrams illustrating methods of wireless communication in accordance with various aspects of the present disclosure.

DETAILED DESCRIPTION

Figure 1:
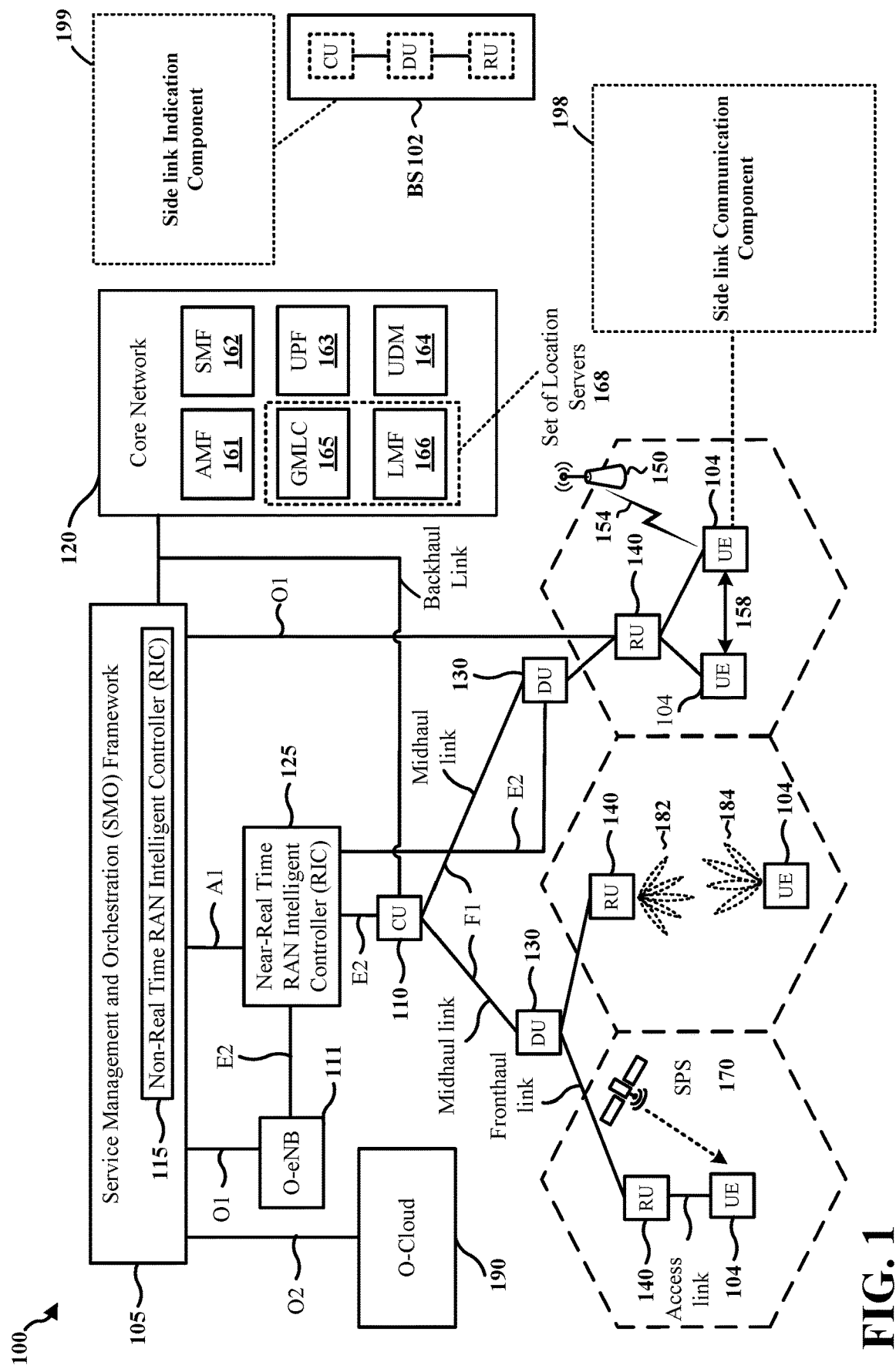
FIG. 1 is a diagram illustrating an example of a wireless communication system and an access network.

Extended-Reality (XR) related wireless communication traffic is quasi-periodic with the characteristics of low-latency and high-reliability requirements. For XR-related applications, periodic traffic of the application layer may arrive at the modem with jitter, e.g., the arrival time of the data traffic may be subject to random jitter. The present disclosure provides methods, apparatus, and computer-readable storage medium for information exchange between side link (SL) UEs and access link UEs (Uu UEs) with or without the base station involvement to enhance the reliability of wireless communication. In some examples, the aspects presented herein may improve wireless communication over multiple links. In some examples, the aspects presented herein may be used improve wireless communication for XR-related applications, among other examples of wireless communication. In some aspects, the UE may communicate with one or more UEs over SL. The UE may transmit or receive configuration information for SL communication with the one or more UEs or uplink communication with a network entity. For example, if the UE is communicating with a network, the UE may receive the configuration information for sidelink communication of another UE. The UE may use the information to adjust uplink transmissions with the network and/or sidelink communication with the other UE. The adjustment may improve communication with the network in view of the sidelink communication and/or to improve sidelink reception at the other UE. If the UE is communicating via sidelink, the UE may receive the configuration information for uplink communication of another UE. In some aspects, the UE may adjust communication based on the information, e.g., to improve the accurate reception of the sidelink communication and/or to reduce interference to the communication of the other UE with the network. By enabling the adjustment of communication between the UEs based on the information of the configuration information, the aspects presented herein improve the reliability of wireless communication, such as in XR-related applications, and/or facilitates the power transfer for energy harvesting UEs.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit wireless signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more SL channels, such as a physical SL broadcast channel (PSBCH), a physical SL discovery channel (PSDCH), a physical SL shared channel (PSSCH), and a physical SL control channel (PSCCH), e.g., which may include SL control information (SCI). D2D communication may be through a variety of wireless D2D communications systems, such as for example, Bluetooth, Wi-Fi based on the Institute of Electrical and Electronics Engineers (IEEE) 802.11 standard, LTE, or NR.

Figure 4:
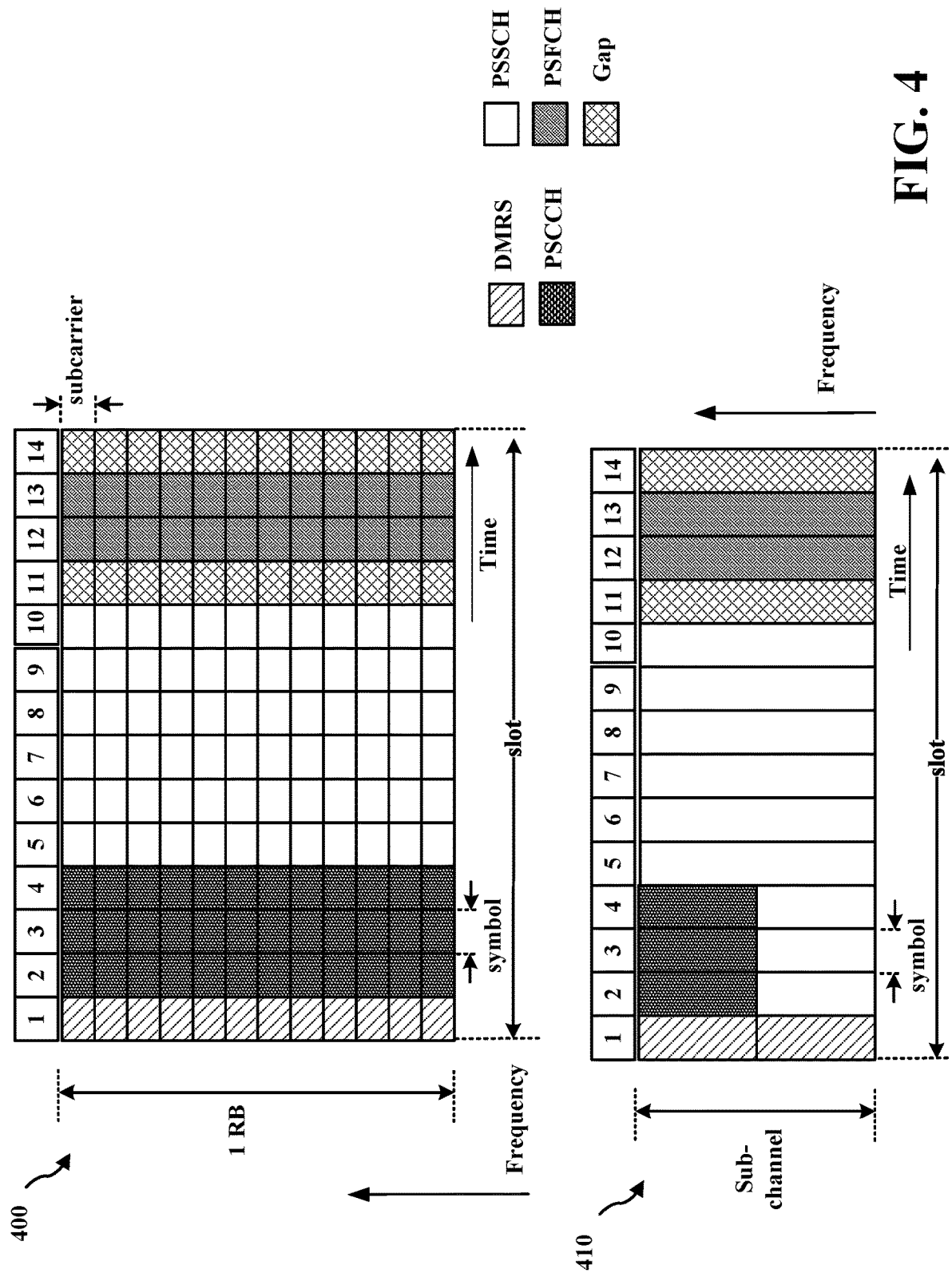
FIG. 4 is a diagram illustrating an example slot structure for SL communication.

Some examples of SL communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. SL communication may be based on V2X or other D2D communication, such as Proximity Services (ProSe), etc. In addition to UEs, SL communication may also be transmitted and received by other transmitting and receiving devices, such as Road Side Unit (RSU), etc. SL communication may be exchanged using a PC5 interface, in some aspects. FIG. 4 illustrates an example slot structure that may be used for SL communication. Although the example slot structure of FIG. 4, may provide example aspects for SL communication in connection with 5G NR, the concepts described herein may be applicable to other similar areas, such as LTE, LTE-A, CDMA, GSM, and other wireless technologies.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, an SL node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an SL communication component 198 that is configured to communicate with one or more UEs over SL; and transmit or receive configuration information for SL communication with the one or more UEs or uplink communication with a network entity. In certain aspects, the base station 102 may include an SL indication component 199 that is configured to receive configuration information for SL communication of a first UE; and provide the configuration information for the SL communication of the first UE to a second UE with which the network entity communicates over an access link. Although the following description may be focused on 5G NR, the concepts described herein may be applicable to other similar areas, such as LTE, LTE-A, CDMA, GSM, and other wireless technologies.

Figure 2:
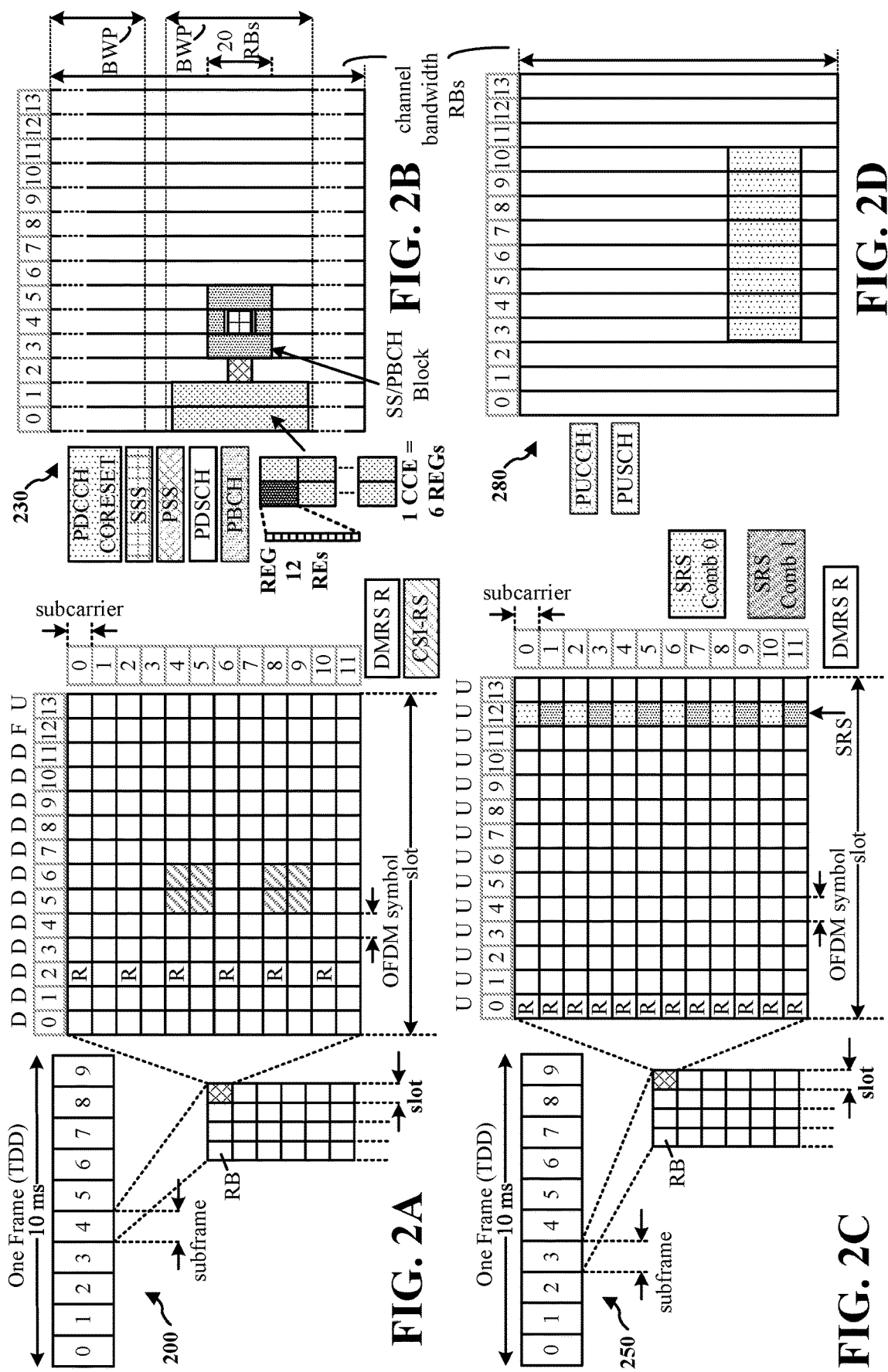
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology ii, there are 14 symbols/slot and 2μ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
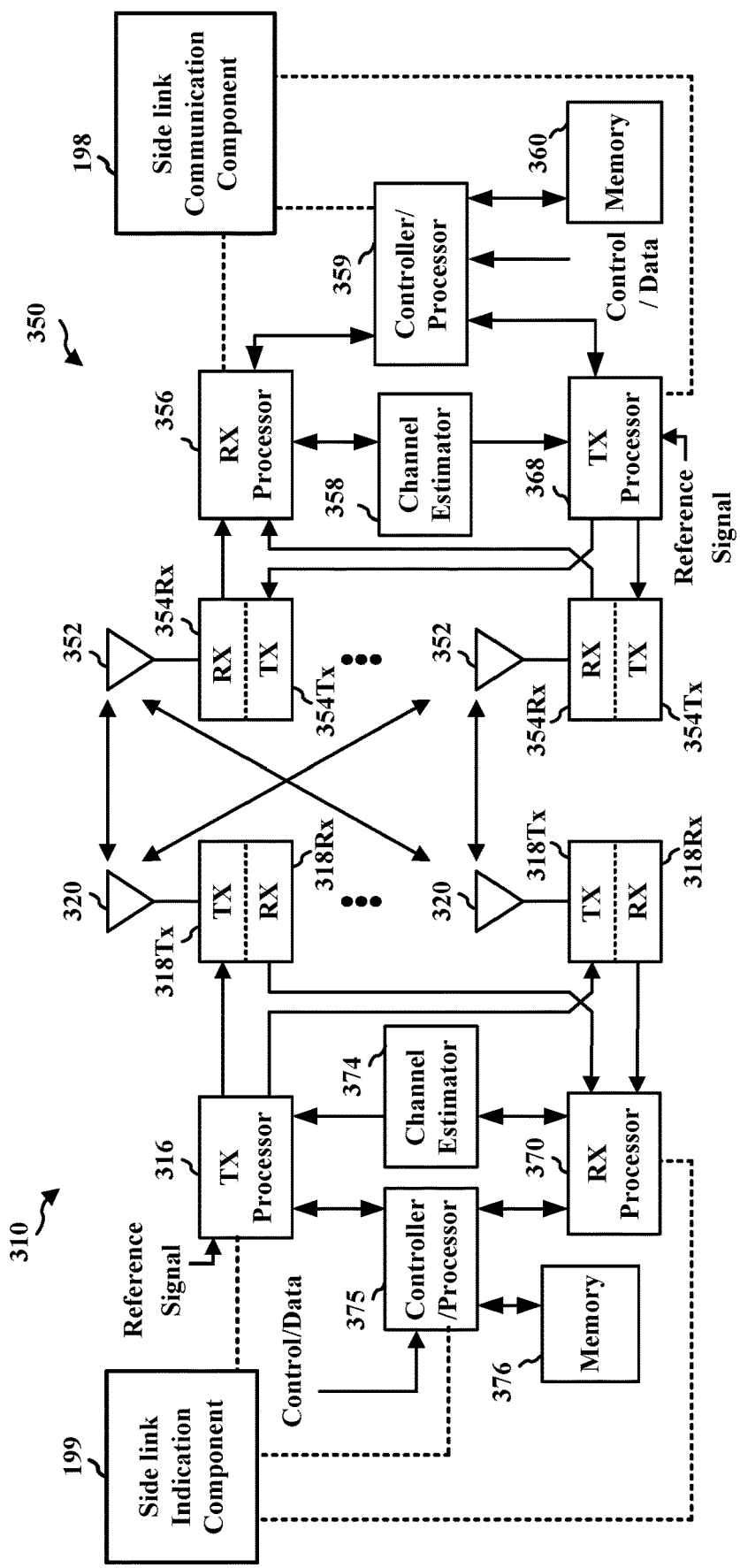
FIG. 3 is a diagram illustrating an example of a base station and user equipment (UE) in an access network.

FIG. 3 is a block diagram of a first wireless communication device 310 in communication with a second wireless communication device 350. In some aspects, the wireless communication may be based on an access link, e.g., a Uu connection. In some aspects, the wireless communication may be based on SL, such as using a PC5 interface. In some aspects, the device 310 may be a base station 310 in communication with a UE (e.g., device 350) in an access network. In some examples, the devices 310 and 350 may communicate based on SL communication, such as V2X, or other D2D communication. As an example, the device 350 may be a UE, and the device 310 may comprise a second UE, an RSU, a base station, etc.

In DL examples, Internet protocol (IP) packets may be provided to a controller/processor 375, for example. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318Tx. Each transmitter 318Tx may modulate a radio frequency (RF) carrier with a respective spatial stream for transmission.

At the device 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the device 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the device 310 in a manner similar to that described in connection with the receiver function at the device 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the SL communication component 198 of FIG. 1.

At least one of the TX processor 316, the RX processor 370, and the controller/processor 375 may be configured to perform aspects in connection with the SL indication component 199 of FIG. 1.

FIG. 4 includes diagrams 400 and 410 illustrating example aspects of slot structures that may be used for SL communication (e.g., between UEs 104, an RSU, etc.). The slot structure may be within a 5G/NR frame structure, in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 4 is merely one example, and other SL communication may have a different frame structure and/or different channels for SL communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A physical SL control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for an SL transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 410 in FIG. 4 illustrates an example in which the PSCCH occupies about 50% of a subchannel, as one example to illustrate the concept of PSCCH occupying a portion of a subchannel. The physical SL shared channel (PSSCH) occupies at least one subchannel. The PSCCH may include a first portion of SL control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 4, some of the REs may include control information in PSCCH and some REs may include demodulation RS (DMRS). At least one symbol may be used for feedback. FIG. 4 illustrates examples with two symbols for a physical SL feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 4. Multiple slots may be aggregated together in some aspects.

A UE may transmit an SL transmission comprising a control channel (e.g., PSCCH) and/or a corresponding data channel (e.g., PSSCH), that may be received by one or more UEs, e.g., received directly from the transmitting UE rather than via a base station. A control channel may include information (e.g., SL control information (SCI)) for decoding the data channel including reservation information, such as information about time and/or frequency resources that are reserved for the data channel transmission.

SL communication may be based on different types or modes of resource allocation mechanisms. In a first resource allocation mode (which may be referred to herein as "Mode 1"), centralized resource allocation may be provided by a network entity. For example, a base station 102 may determine resources for SL communication and may allocate resources to different UEs 104 to use for SL transmissions. In this first mode, a UE receives the allocation of SL resources from the base station 102. In a second resource allocation mode (which may be referred to herein as "Mode 2"), distributed resource allocation may be provided. In Mode 2, each UE may autonomously determine resources to use for SL transmission. In order to coordinate the selection of SL resources by individual UEs, each UE may use a sensing technique to monitor for resource reservations by other SL UEs and may select resources for SL transmissions from unreserved resources. Devices communicating based on SL, may determine one or more radio resources in the time and frequency domain that are used by other devices in order to select transmission resources that avoid collisions with other devices. The SL transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for SL transmission, e.g., without a central entity such as a base station indicating the resources for the device. A first UE may reserve the selected resources in order to inform other UEs about the resources that the first UE intends to use for SL transmission(s).

In some examples, the resource selection for SL communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected SL resource has been reserved by other UE(s) before selecting an SL resource for a data transmission. If the UE determines that the SL resource has not been reserved by other UEs, the UE may use the selected SL resource for transmitting the data, e.g., in a PSSCH transmission. The UE may estimate or determine which radio resources (e.g., SL resources) may be in-use and/or reserved by others by detecting and decoding SCI transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for SL transmission by the UE, and the UE may select/reserve resources for an SL transmission from the resources that are unused and therefore form the set of candidate resources. The UE may continuously perform sensing for SCI with resource reservations in order to maintain a set of candidate resources from which the UE may select one or more resources for an SL transmission. Once the UE selects a candidate resource, the UE may transmit SCI indicating its own reservation of the resource for an SL transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on SL.

Extended-Reality (XR) related wireless communication traffic is quasi-periodic with the characteristics of low-latency and high-reliability requirements. For XR-related applications, periodic traffic of the application layer may arrive at the modem with jitter. The arrival time may subject to random jitter. As an example, the random jitter may be assumed to follow truncated Gaussian distribution with a zero mean, 2 milliseconds standard deviation and a range of [−4, 4] milliseconds. The XR-related traffic flows may have a limited packet delay budget (PDB), and the PDB requirement may be stringent for some flows. The UL XR-related traffic may be frequently transmitted in actual application. Table. 2 shows the PDB of various XR-related applications.

TABLE 2

PDB for various XR-related applications

| Flow | Description | Bit Rate (Mbps) | Frequency (Hz) | Period (ms) | Average Payload (kbits) | Airlink PDB (ms) |
|------|-------------|-----------------|----------------|-------------|-------------------------|------------------|
| A | DL Video | 10.000 | 48 | 20.83 | 208.33 | 7 |
| H | DL Audio | 0.094 | 48 | 20.83 | 1.95 | 15 |
| B | UL Head Pose | 0.094 | 96 | 10.42 | 0.98 | 1 |
| C1 | UL Hand Tracking | 0.491 | 23 | 43.48 | 21.35 | 10 |
| F | UL Face Tracking (for Stats/Feature points) | 0.038 | 15 | 66.67 | 2.53 | 67 |
| E | UL Camera Frames (for 3D Reconstruction and Object Recognition) | 2.133 | 5 | 200.00 | 426.60 | 100 |
| G | UL Audio | 0.094 | 48 | 20.83 | 1.95 | 15 |

In some applications, a UE may not transmit a scheduling request (SR) or a BSR for each TB, and the UE may not blind decode DCI for each PUSCH transmission, which may lower the transmission latency and save power consumption for the XR-related UEs. Considering the characteristics of the XR-related traffic, it may be beneficial to transmit cell group (CG) based PUSCHs or multi-PUSCHs scheduled by a UL DCI.

Aspects provided herein provide improvements and optimizations that can improve wireless communication for XR-related applications. The improvements/optimizations may include enabling more awareness of the XR traffic (both UL and DL) characteristics, QoS metrics, and application layer attributes and the utilization of this information to aid XR-specific traffic handling. The improvement/optimizations may further include capacity improvements, such as the SPS and CG enhancement and the dynamic scheduling/grant enhancements, that provide more efficient resource allocation and scheduling for XR service characteristics, such as periodicity, multiple flows, jitter, latency, and reliability of the XR services. Although XR is one example of a type of wireless communication or signaling, the aspects presented herein may help to improve any of various types of wireless communication and signaling, including access link communication with a network, sidelink communication, energy harvesting, etc.

The present disclosure provides methods, apparatus, and computer-readable storage medium for information exchange between side link (SL) UEs and Uu UEs with or without network involvement to enhance the reliability of the wireless communication for the UEs. Aspects include a power control switch based on an event such as serving an energy harvesting UE with data or energy, and discuss power control constraints for Non-Orthogonal Multiple Access (NOMA) transmissions and a concept of relaxed power control when an SL UE has shared information about sidelink resource allocations and/or configuration information with a base station. The methods, apparatus, and computer-readable medium hereby present increase the reliability of wireless communication, such as in XR applications, and facilitate power transfer with energy harvesting UEs while also providing for communication on multiple links.

Figure 5A:
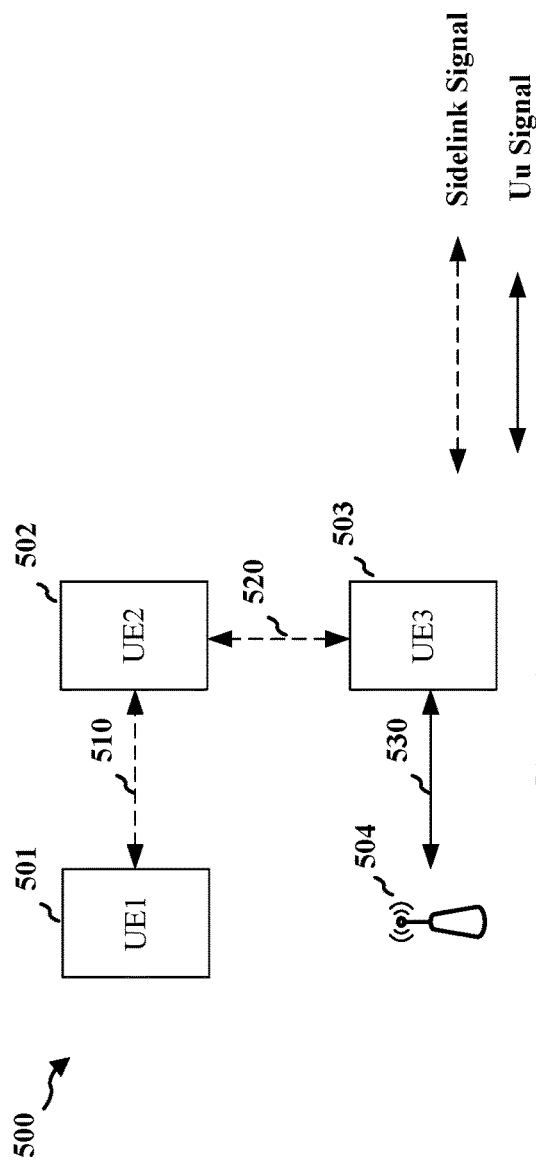
FIG. 5A is a diagram illustrating connections among the UEs and the base station in accordance with various aspects of the present disclosure.

FIG. 5A is a diagram 500 illustrating signal management on multiple links in accordance with various aspects of the present disclosure. As shown in FIG. 5A, a UE1 501 and UE2 502 may communicate using a sidelink (SL) connection (e.g., 510). The UE3 503 may be using a Uu link or access link 530 with a network node such as a base station 504 and may also exchange sidelink communication with UE1 501 and or UE2 502, e.g., over sidelink 520. For example, the UE3 503 may have an RRC connection established for sidelink with one or both of the UE1 501 and the UE1 502.

Referring to FIG. 5A, in one example, the UE2 502 and the UE3 503 may be RRC connected, e.g., and may exchange sidelink communication, as shown at 520. During some UL slots (a subset of which may overlap with, e.g., be used for, the SL communication of one or more of the UE1 501, the UE2 502 and/or UE3 503), the uplink and/or downlink communication between the UE3 503 and the base station 504 may interfere with the sidelink communication for UE1 501 and/or UE2 502. Similarly, the sidelink communication from UE1 501 and/or UE2 502 may cause interference to downlink reception of the UE3 503 and/or uplink reception of the bases station 504. Aspects presented herein provide for the exchange of communication about planned sidelink communication and/or access link communication for one UE that enables one of the other UEs to make wireless communication adjustments either to improve their own communication or to improve reception at the UE providing the information.

Figure 5B:
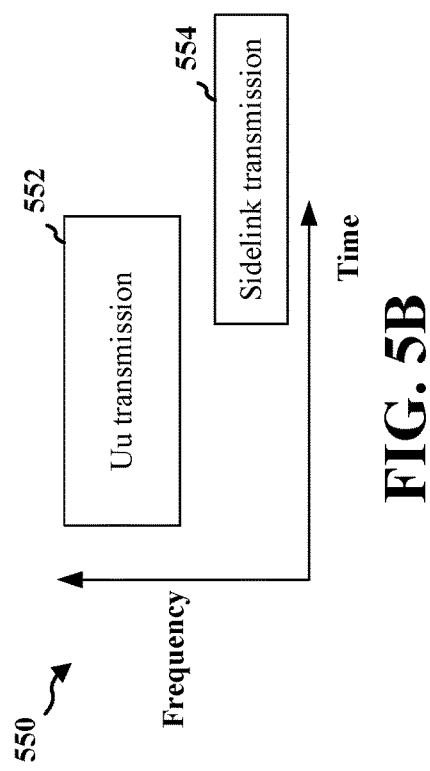
FIG. 5B is a diagram illustrating an overlap between an uplink transmission and a sidelink transmission in accordance with various aspects of the present disclosure.

In some aspects, the UE3 503 may signal its UL configured grant configuration information (e.g., which may include a CG type 1 or CG type 2) so that the UE1 501 and the UE2 502 adjust their transmission parameters (e.g., Modulation and Coding Scheme (MCS)) accordingly for optimized communication. As an example, the UE2 502 might use a different MCS for sidelink communication that will overlap with a CG resource for the UE3 (e.g., either to avoid interference to the communication between the UE3 503 and the base station 504 or to improve sidelink reception at UE1 501). A change in MCS is only one example of a communication adjustment. In other aspects, the UE2 may use a different transmission power, resource, MCS, or other transmission parameter for transmission of sidelink communication that would overlap with the configured resources for the UE3 503 than for sidelink communication that would not overlap with the configured resources for the UE3 503. FIG. 5B illustrates an example resource diagram 550 showing an uplink transmission 552 that overlaps in time with a sidelink transmission 554. Although the overlap is only shown for the time domain, in some aspects, the uplink transmission and the sidelink transmission may additionally, or alternatively, have overlapping frequency resources.

In another example, referring to FIG. 5A, a transmitting UE (which may be one of the UE1 501 and the UE2 502) or the base station 504 may signal the configuration of SL configured grants to the UE3 503. In some aspects, the resources for the sidelink communication may be configured by the base station 504 for the UE1 501 and/or the UE2 502. As an example, the UE2 502 may provide the resource allocation information for sidelink communication of the UE2 502 and/or the UE1 501 to the UE3 503 in a sidelink message. In some aspects, the base station 504 may provide the resource allocation information for the sidelink communication of the UE1 501 and/or the UE2 502 to the UE3 in a downlink message. The UE3 503 may avoid using the resources (e.g., slots) in the SL configured grants of the UE1 501 or the UE2 502 for its own uplink transmission.

In some aspects, an SL UE (e.g., the UE1 501 or the UE2 502) may share the configuration information for sidelink communication with a Uu UE (e.g., a UE engaging in or supporting Uu communication with a network, such as the UE3 503) so that the other UE may adjust its communication based on the configuration information for the sidelink communication. The configuration information may be provided directly to the UE3, e.g., in a sidelink message from the UE1 501 or UE2 502. The UE3 may receive the configuration information via the base station 504, e.g., in a downlink message after the UE1 501 or UE2 502 provides the configuration information to the base station 504. The configuration information that is shared for the sidelink communication (e.g. of UE1 501 or UE2 502) may include, but is not limited to, one or more of a time domain resource allocation (TDRA), a frequency domain resource allocation (FDRA), power control information for a transmission power that the UE will use to transmit the sidelink communication, beam information (e.g., a beam that the UE1 or UE2 plans to use to transmit the sidelink communication), an MCS for the sidelink communication, a data priority indication for data to be transmitted in the sidelink communication, and PDB information such as a remaining PDB for data to be transmitted in the sidelink communication. For example, based on the configuration information shared by the SL UE (e.g., UE1 501 or UE2 502), the UE3 503 may cancel an uplink transmission or adjust the uplink transmission, such as to reduce the power of, or other transmission parameter of, the uplink transmission to reduce or eliminate the interference caused by the uplink transmission of UE3 503 to the SL communication of UE1 501 or UE2 502.

The UE3 503 may change the transmission parameters of an uplink transmission that overlaps in time and/or frequency with sidelink communication of the UE1 501 or UE2 502, including using a different power control, MCS, and/or beam for the uplink transmission, based on whether the uplink transmission overlaps with (e.g., uses the corresponding resources) as the sidelink communication. The UE3 503 may change the transmission parameters of the uplink transmission further based at least in part on one or more of the elements including: the priority of the Uu packet to be transmitted by the UE3 503 in the uplink transmission, the priority of the SL UE packet to be transmitted by the UE1 501 or UE2 502, the remaining PDB of the Uu packet to be transmitted by the UE3 503 in the uplink transmission, the remaining PDB of the SL packet to be transmitted by the UE1 501 or the UE2 502 (e.g., if is known based on the priority and a timestamp added to the packet), configuration information shared by the SL UE(s) (e.g., UE1 501 or UE2 502) about the sidelink communication (such as a beam direction, Transmitted Precoding Matrix Indicator (TPMI), TDRA, FDRA, and/or power control information for the sidelink communication), or a combinations thereof.

FIG. 13A illustrates an example communication flow 1300 showing a UE 1304 that exchanges Uu communication with a base station 1306. The UE 1304 may correspond to the UE3 503, for example. As illustrated at 1310, the UE 1304 receives configuration information about sidelink communication from the UE 1302, e.g., in a sidelink message from the UE 1302. In response, the UE 1304 may adjust, at 1312, one or more parameters or resources for an uplink transmission 1317 to the base station 1306. The adjustment may address potential interference to the uplink transmission 1317 that may be caused by the sidelink transmission (e.g., 1316) of the UE 1302 to the UE 1308. Alternatively, the adjustment to the uplink transmission 1317 may reduce interference caused by the uplink transmission 1317 to reception of the sidelink communication 1316 (e.g., the reception by either the UE 1308 or the UE 1302).

FIG. 13B illustrates an example communication flow 1350 showing a UE 1352 that exchanges Uu communication with a base station 1354. The UE 1352 may correspond to the UE3 503, for example. As illustrated at 1362, the UE 1352 receives configuration information about sidelink communication of the UE 1356 from the base station 1354, e.g., in a downlink message. The base station 1354 may receive the configuration information from the UE 1356, at 1360. As illustrated at 1364, the UE 1352 may adjust one or more parameters or resources for the uplink transmission 1368. Similarly, the base station 1354 may adjust, at 1366, one or more parameters of the downlink transmission 1370 based on the configuration information received for the sidelink communication of the UE 1356. The adjustment, at 1364 or 1366, may address potential interference to the uplink transmission 1368 or the downlink transmission 1370 that may be caused by the sidelink transmission (e.g., 1372) of the UE 1356 to the UE 1358. Alternatively, the adjustment to the uplink transmission 1368 or the downlink transmission 1370 may reduce interference caused by the uplink transmission 1368 or the downlink transmission 1370 to reception of the sidelink communication 1372 (e.g., the reception by either the UE 1358 or the UE 1356).

In some aspects, a UE, such as the UE1 501 or the UE2 502 that is transmitting sidelink communication, may change transmission parameters for a sidelink transmission based on information about the Uu communication of the UE3 503. As an example, the UE1 501 or UE2 502 may adjust or change at least one of resources, power control, an MCS, and/or a beam of the sidelink transmission based on whether the UE3 503 is using the corresponding resources for communication with the base station 504. The UE1 501 or UE2 502 may adjust the sidelink transmission to improve reception of the sidelink communication. For example, the UE2 502 may adjust a parameter of a sidelink transmission to the UE1 501 (e.g., increasing a transmission power or reducing an MCS) to improve reception of sidelink transmission when it overlaps in time and/or frequency with an uplink transmission by the UE3 503. In other aspects, the UE2 502 may adjust a parameter of a sidelink transmission to the UE1 to avoid interference to communication between the UE3 503 and the base station 504. The SL UE may change the transmission parameters of the sidelink transmission based at least in part on one or more of the elements including: the priority of the Uu UE packet to be transmitted by the UE3 503, the priority of the SL UE packet, the remaining PDB of the Uu packet to be transmitted by the UE3 503, the remaining PDB of the SL packet (if it is known based on the priority and a timestamp added to the packet), information shared by the UE3 503 with the SL UE or received via the base station (such as the beams, TPMI, TDRA, FDRA, power control of the uplink transmission), or a combination thereof.

FIG. 14A illustrates an example communication flow 1400 showing a UE 1404 that exchanges Uu communication with a base station 1406. The UE 1404 may correspond to the UE3 503, for example. As illustrated at 1410, the UE 1404 transmits configuration information about Uu communication to the UE 1402, e.g., in a sidelink message from the UE 1404. In response, as illustrated in 1412, the UE 1402 may adjust one or more parameters or resources for a sidelink transmission (e.g., 1416) to the UE 1408. The adjustment may address potential interference to Uu communication 1417 that may be caused by the sidelink transmission (e.g., 1416) of the UE 1402 to the UE 1408. Alternatively, the adjustment to the sidelink transmission (e.g., 1416) may to reduce interference caused by the Uu communication 1417 to reception of the sidelink communication 1416 (e.g., the reception by either the UE 1408 or the UE 1402).

FIG. 14B illustrates an example communication flow 1450 showing a UE 1452 that exchanges Uu communication 1470 with a base station 1454. The UE 1452 may correspond to the UE3 503, for example. As illustrated at 1460, the UE 1456 receives configuration information about Uu communication of the UE 1452 from the base station 1454, e.g., in a downlink message. As illustrated at 1466, the UE 1456 may adjust one or more parameters or resources for the sidelink transmission (e.g., 1472) based on the configuration information received from the base station for the Uu communication 1470. The adjustment, at 1466, may address potential interference to the Uu communication 1470 that may be caused by the sidelink transmission (e.g., 1472) of the UE 1456 to the UE 1458. Alternatively, the adjustment to the sidelink transmission (e.g., 1472), at 1466, may reduce interference caused by the Uu communication 1470 to reception of the sidelink communication 1472 (e.g., the reception by either the UE 1458 or the UE 1456).

If the base station 504 is aware of the SL configuration (e.g., receives it from the UE1 501 or UE2 502), the base station may indicate to the UE3 503 to adjust at least one or more of the transmission parameters of the uplink communication of UE3 503 to accommodate the sidelink communication of the UE1 501 or the UE2 502. The transmission parameters may include, but are not limited to, power control, beams, TPMI, MCS, and number of transmit ports/layers. The adjustment of the transmission parameters may be made based at least in part on one or more of elements including: the priority of the Uu UE packet, the priority of the SL UE packet, the remaining PDB of the Uu packet, the remaining PDB of the SL packet, information shared from the SL UEs with the Uu UE or with the base station (such as beams, TPMI, TDRA, FDRA, power control), or a combination thereof. In some aspects, the Uu UE may adjust the beams, and the TPMI may be selected to reduce or eliminate the interference at the SL receiving UEs.

In one example, the UE3 503 may signal a beam restriction to UE1 501 or the UE2 502 to limit one or more beams for the sidelink communication transmitted by the UE1 501 or the UE2 502. In another example, the base station 504 may, based on feedback information from the UE3 503 on the current suggested beam to communicate with the base station, indicate a beam, or beams, to be used, or to be avoided, by the UE1 501 or the UE2 502. In addition, the base station 504 may signal a beam restriction for the UE3 503 to avoid interference from the sidelink transmissions of the UE1 501 or UE2 502 on the Uu communication of the UE3 503. In some aspects, the base station 504 may indicate a beam, or beam limitation, to the UE3 503 to avoid interference from an uplink transmission of the UE3 503 to a sidelink communication of the UE1 501 or the UE2 502. In some aspects, the base station 504 or the UE3 503 may indicate the beam information based on the importance/priority of the SL transmissions. The base station 504 may reduce interference impact at the base station from the SL transmitting UE by adjusting the analog beam and digital beam/precoder of Uu UEs.

In the above examples, the adjustment of the transmission parameters may depend on the extent, or amount, of the resource overlap between the resources for the Uu communication and the resource for the sidelink communication. That is, the parameter adjustment and the mapping table reflecting the correspondence between the parameter adjustment and the corresponding elements may depend on the amount of overlap in time or frequency domain (or both) between the SL communication and the Uu communication, e.g., such as shown in the example in FIG. 5B. In some examples, the mapping may be a function of the extent of the overlap between the REs, the RBs, group of RE, or group of RBs between the SL link and the Uu link. The mapping may also depend on the amount of resource overlapping in time domain and the amount of resource overlapping in frequency domain between the SL communication and the Uu communication.

The base station may leverage SL shared information for NOMA transmissions. A base station 504 may constrain the power arriving at its receiver from SL communication (e.g., the UE1 501 or UE2 502) to reduce interference at the base station. However, in the applications that adopt NOMA, doing so may introduce interference at the base station, especially when more than two UEs are using the same slot. Hence, NOMA slots may include the adjustment (e.g., more power control constraint) from the base station.

In one configuration, the base station 504 may define some additional power offsets at UEs that apply NOMA on SL communication to further reduce the interference at the base station 504. The power offset may be a function of the number of UEs that are using the NOMA allocations during the resource allocations (with configured grant configuration type 1 or type 2, or dynamic allocation).

If the UE1 501 or the UE2 502 share the SL configuration information with the base station 504, the base station may cancel some interference without constraining the interference from the sidelink communication of the UE1 501 or the UE2 502. In this example, when the base station 504 performs successive interference cancelation, receiving the SL transmission with a higher power may actually facilitate the removal of the interference due to the SL transmission. Hence, the base station 504 may not constrain, or may reduce a constraint, the transmission power for the sidelink transmission, which may be useful for energy harvesting applications. For example, a higher transmission power may allow for a more effective signal to provide energy to an energy harvesting device.

If the UE1 or the UE2 shares the SL configuration with the base station 504, and if the receiving UE is an energy harvesting (EH) UE (either receiving for data or energy), then the UE1 or the UE2 may relax the DL pathloss constraint (e.g., based on the energy harvesting UE or an agreement by an energy harvesting UE and the base station 504).

In some applications, even if the base station 504 requests for a UE to use a DL pathloss configuration, there could be an event-based switching mechanism to use another pathloss configuration and target power configuration (e.g., for the SL link between UEs or a Uu link between UE and a network node or another pathloss/target power configuration) to transmit energy or data with a relatively higher power, so that an EH receiving UE may leverage the higher power (e.g., some EH UEs may do power splitting between EH and data reception).

Figure 6:
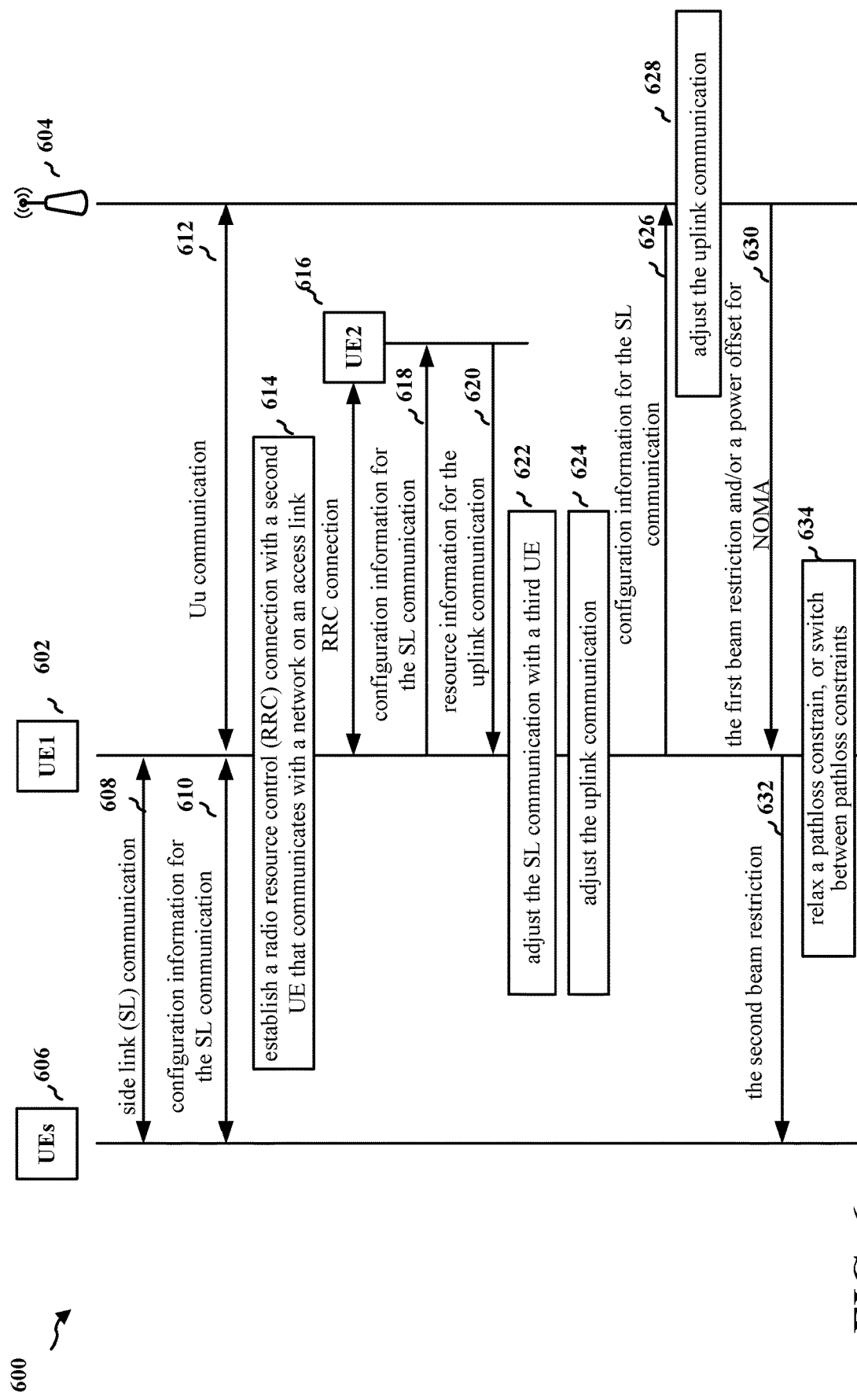
FIG. 6 is a call flow diagram illustrating a method of wireless communication in accordance with various aspects of the present disclosure.

FIG. 6 is a call flow diagram 600 illustrating a method of wireless communication in accordance with various aspects of the present disclosure. Although aspects are described for a base station 604, the aspects may be performed by a base station in aggregation and/or by one or more components of a base station 604 (e.g., such as a CU 110, a DU 130, and/or an RU 140).

As shown in FIG. 6, a first UE 602 may communicate with one or more UEs 606 over SL communication 608. At 610, the first UE 602 may transmit or receive configuration information for SL communication with the one or more UEs 606. The first UE 602 may transmit or receive, at 612, uplink communication with a base station 604.

In some aspects, the first UE 602 may, at 614, establish an RRC connection with a second UE 616 that communicates with a network on an access link. In one configuration, the second UE 616 may be one UE of the one or more UEs 606. In another configuration, the second UE 616 may be a different UE than the one or more UE 606.

At 618, the first UE 602 may transmit the configuration for the SL communication (608) to the second UE 616. The first UE 602 may receive, at 620, resource information for the uplink communication of the second UE 616 from the second UE 616. At 622, the first UE 602 may adjust the SL communication (608) with a third UE. The adjustment may be made based on the resource information for the uplink communication of the second UE 616. In one configuration, the third UE may be one UE of the one or more UEs 606.

At 624, the first UE 602 may adjust the uplink communication (612) with the base station 604 based on the configuration information for the SL communication (608) with the one or more UEs 606. In some aspects, the first UE 602 may receive an indication from the base station 604 to adjust the uplink communication (612) with the base station 604 based on the configuration information for the SL communication (608).

At 626, the first UE 602 may transmit the configuration information for SL communication (608) of the first UE to the base station 604. At 628, the base station 604 may adjust the uplink communication (612) based on the configuration information of the SL communication (608) it receives at 626.

At 630, the first UE 602 may receive the first beam restriction from the base station 604. The first UE 602 may also receive the first beam restriction from the second UE 616. At 630, the first UE 602 may also receive from the base station 604 a power offset for non-orthogonal multiple access (NOMA) over the SL to reduce interference at the base station 604. At 632, the first UE 602 may transmit the second beam restriction to the one or more UEs 606 for the SL communication (608). At 634, the first UE 602 may relax a pathloss constraint. In one configuration, the base station

604 may relax the pathloss constraint based on the energy harvesting operation of the first UE 602. Alternatively, the base station 604 may relax the pathloss constraint based on the transmission of the configuration information for the SL communication (608) to the base station 604.

Figure 7:
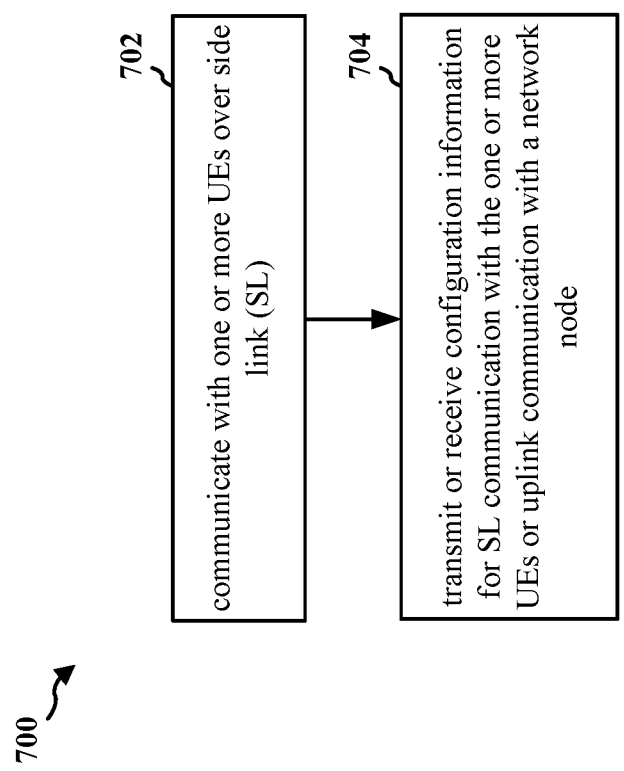
FIG. 7 is the first flowchart illustrating a method of wireless communication at a UE in accordance with various aspects of the present disclosure.

FIG. 7 is the flowchart 700 illustrating a method of wireless communication at a UE in accordance with various aspects of the present disclosure. The method may be performed by a UE (i.e., a first UE). The UE may be the UE 104, 502, 503, 602, 1302, 1304, 1352, 1356, 1402, 1404, 1452, 1456; device 350; or the apparatus 1104 in the hardware implementation of FIG. 11. The method enables the adjustment of SL communication between the UEs based on the information of the access link. Thus, it improves the reliability of wireless communication, particularly for XR-related applications, and facilitates the power transfers of energy harvesting UEs.

As shown in FIG. 7, at 702, the first UE may communicate with one or more UEs over SL. FIG. 6 illustrates various aspects of the steps in connection with flowchart 700. For example, referring to FIG. 6, the first UE 602 may communicate with one or more UEs 606 over SL communication 608.

At 704, the first UE may transmit or receive configuration information for SL communication with the one or more UEs or uplink communication with a network entity. The network entity may be a base station, or a component of a base station, in the access network of FIG. 1 or a core network component (e.g., base station 102, 504; base station 504, 604; device 310; or the network entity 1102 in the hardware implementation of FIG. 11). For example, referring to FIG. 6, the first UE 602 may transmit or receive, at 610, configuration information for SL communication (608) with the one or more UEs 606. The first UE 602 may, at 612, transmit or receive uplink communication (612) with a network entity (base station 604). FIG. 13A illustrates an example in which a UE 1302 transmits configuration information for sidelink communication to a UE 1304. FIG. 13A also illustrates an example in which the UE 1304 receives the configuration information for the sidelink communication from the UE 1302. FIG. 13B illustrates an example in which a UE 1356 transmits configuration information for sidelink communication to a base station 1354. FIG. 13B also illustrates an example in which the UE 1352 receives the configuration information for the sidelink communication of the UE 1356 from the base station 1354. FIG. 14A illustrates an example in which the UE 1402 receives configuration information for Uu communication of the UE 1404 from the UE 1404. FIG. 14B illustrates an example in which the UE 1456 receives configuration information for the Uu communication of the UE 1452 from the base station 1454.

Figure 8:
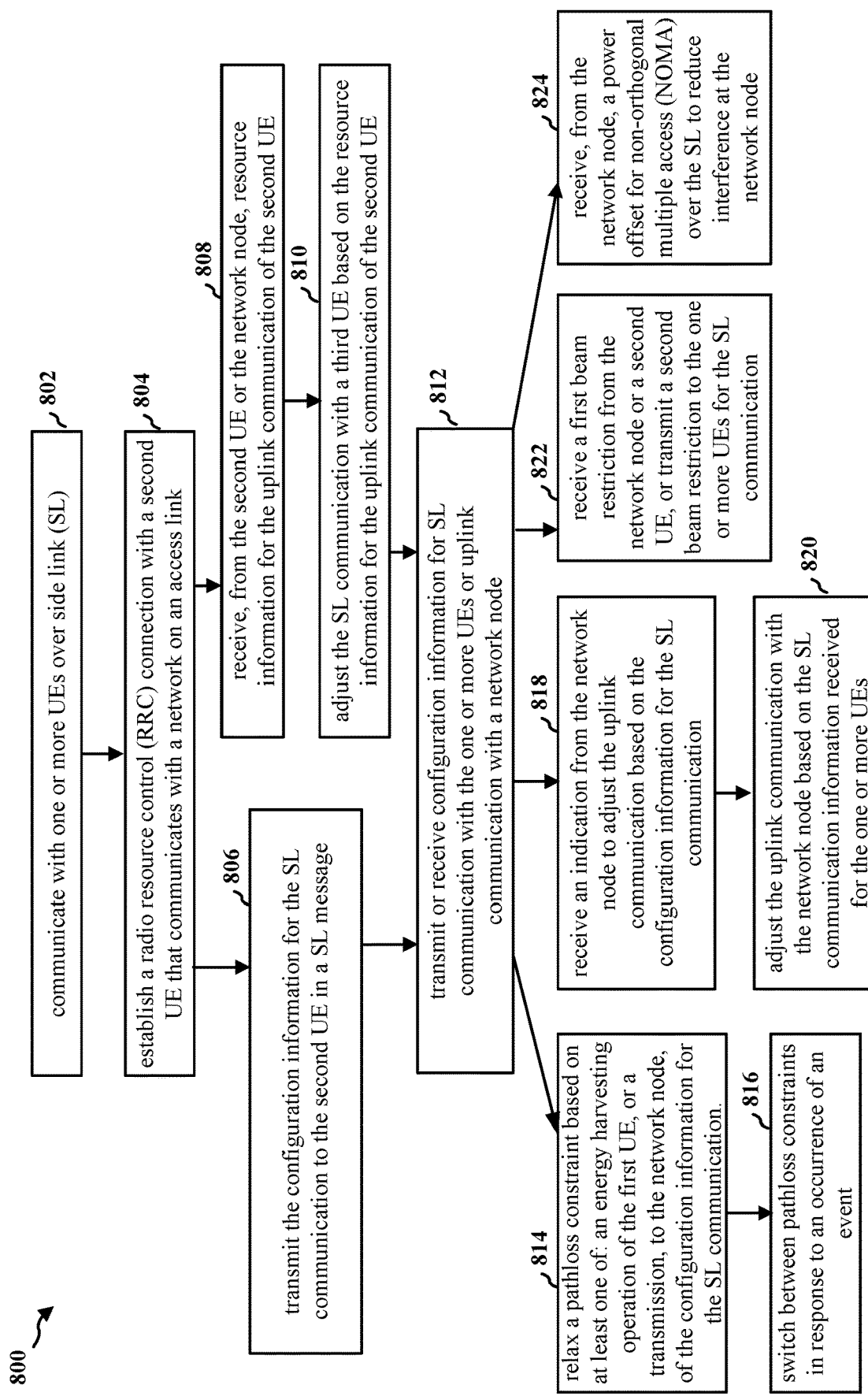
FIG. 8 is the second flowchart illustrating a method of wireless communication at a UE in accordance with various aspects of the present disclosure.

FIG. 8 is a flowchart 800 illustrating a method of wireless communication at a UE in accordance with various aspects of the present disclosure. The method may be performed by a UE (i.e., a first UE). The UE may be the UE 104, 502, 503, 602, 1302, 1304, 1352, 1356, 1402, 1404, 1452, 1456; device 350; or the apparatus 1104 in the hardware implementation of FIG. 11. The method enables the adjustment of SL communication between the UEs based on the information of the access link. The method improves the reliability of wireless communication, particularly in XR-related applications, and facilitates the power transfers of energy harvesting UEs.

As shown in FIG. 8, at 802, the first UE may communicate with one or more UEs over SL. FIG. 6 illustrates various aspects of the steps in connection with flowchart 800. For example, referring to FIG. 6, the first UE 602 may communicate with one or more UEs 606 over SL communication 608.

At 812, the first UE may transmit or receive configuration information for SL communication with the one or more UEs or uplink communication with a network entity. The network entity may be a base station, or a component of a base station, in the access network of FIG. 1 or a core network component (e.g., base station 102; base station 504, 604; device 310; or the network entity 1102 in the hardware implementation of FIG. 11). For example, referring to FIG. 6, the first UE 602 may transmit or receive, at 610, configuration information for SL communication (608) with the one or more UEs 606. The first UE 602 may, at 612, transmit or receive uplink communication (612) with a network entity (base station 604). FIG. 13A illustrates an example in which a UE 1302 transmits configuration information for sidelink communication to a UE 1304. FIG. 13A also illustrates an example in which the UE 1304 receives the configuration information for the sidelink communication from the UE 1302. FIG. 13B illustrates an example in which a UE 1356 transmits configuration information for sidelink communication to a base station 1354. FIG. 13B also illustrates an example in which the UE 1352 receives the configuration information for the sidelink communication of the UE 1356 from the base station 1354. FIG. 14A illustrates an example in which the UE 1402 receives configuration information for Uu communication of the UE 1404 from the UE 1404. FIG. 14B illustrates an example in which the UE 1456 receives configuration information for the Uu communication of the UE 1452 from the base station 1454.

In some aspects, the configuration information may include one or more of: a configured grant resource allocation for the SL communication, power control information for the SL communication, beam information for the SL communication, a modulation and coding scheme (MCS) for the SL communication, a data priority indication for the SL communication, or packet delay budget information for the SL communication. For example, referring to FIG. 6, when the first UE 602 transmits or receives, at 610, the configuration information for the SL communication with the one or more UEs 606, the configuration information may include one or more of: the configured grant resource allocation for the SL communication (608), the power control information for the SL communication (608), the beam information for the SL communication (608), the MCS for the SL communication (608), the data priority indication for the SL communication (608), or the PDB information for the SL communication (608).

At 804, the first UE may establish a radio resource control (RRC) connection with a second UE that communicates with a network on an access link. In one configuration, the second UE may be one UE of the one or more UEs. For example, referring to FIG. 6, the first UE 602 may establish an RRC connection with a second UE 616 that communicates with a network on an access link. In one configuration, the second UE 616 may be one UE of the one or more UEs 606.

At 806, the first UE may transmit the configuration information for the SL communication to the second UE in an SL message. For example, referring to FIG. 6, the first UE 602 may transmit, at 618, the configuration information for the SL communication (608) to the second UE 616 in an SL message.

At 808, the first UE may receive, from the second UE or the network entity, resource information for the uplink communication of the second UE. For example, referring to FIG. 6, the first UE 602 may receive, at 620, from the second UE 616, resource information for the uplink communication of the second UE 616. In one configuration, the first UE 602 may receive the resource information for the uplink communication of the second UE 616 from the network entity (base station 604).

At 810, the first UE may adjust the SL communication with a third UE based on the resource information for the uplink communication of the second UE. In one configuration, the third UE may be one UE of the one or more UEs. For example, referring to FIG. 6, the first UE 602 may, at 622, adjust the SL communication with a third UE based on the resource information for the uplink communication of the second UE 616, which is received at 620. In one configuration, the third UE may be one UE of the one or more UEs 606.

In some aspects, the first UE may adjust the sidelink communication with the third UE by adjusting one or more of: the transmission power of the SL communication, the MCS of the SL communication, or the beam direction for the SL communication. For example, referring to FIG. 6, when the first UE 602 adjusts, at 622, the SL communication with the third UE, the first UE 602 may adjust one or more of: the transmission power of the SL communication with the third UE, the MCS of the SL communication with the third UE, or the beam direction for the SL communication with the third UE.

At 820, the first UE may adjust the uplink communication with the network entity based on the configuration information of the SL communication of the one or more UEs. For example, referring to FIG. 6, the first UE 602 may adjust, at 624, the uplink communication (612) with the network entity (base station 604) based on the configuration information of the SL communication (608) of the one or more UEs 606, which is received at 610.

In some aspects, the first UE may adjust the uplink communication with the network entity by adjusting one or more of: the resource used for the uplink communication, the transmission power of the uplink communication, the MCS of the uplink communication, the transmitted analog beam of the uplink communication, the TPMI of the uplink communication, the rank of the uplink communication, or the beam direction for the uplink communication. For example, referring to FIG. 6, when the first UE 602 adjusts, at 624, the uplink communication with the network entity (base station 604), the first UE 602 may adjust one or more of: the resource used for the uplink communication (612), the transmission power of the uplink communication (612), the MCS of the uplink communication (612), the transmitted analog beam of the uplink communication (612), the TPMI of the uplink communication (612), the rank of the uplink communication (612), or the beam direction for the uplink communication (612).

At 818, the first UE may receive an indication from the network entity to adjust the uplink communication based on the configuration information for the SL communication. For example, referring to FIG. 6, prior to adjusting the uplink communication at 624, the first UE 602 may receive an indication from the network entity (base station 604) to adjust the uplink communication based on the configuration information for the SL communication (608).

In some aspects, the first UE may adjust the uplink communication to reduce interference for SL reception at the one or more UEs. For example, referring to FIG. 6, the first UE 602 may adjust the uplink communication (612) to reduce interference for SL reception at the one or more UEs 606.

In some aspects, when the first UE adjusts the uplink communication with the network entity, the adjustment may be done based on one or more of: the uplink packet priority at the first UE, the SL packet priority for the SL communication, the first PDB of an uplink packet at the first UE, the quality of service (QoS) of the uplink packet at the first UE, the second PDB of an SL packet for the SL communication, the QoS of the SL packet for the SL communication, or one or more transmission parameters for the SL communication. The uplink packet priority may be based on a layer 1 priority of the uplink packet, the layer 2 priority of the uplink packet, or a combination of the layer 1 priority and the layer 2 priority of the uplink packet. The SL packet priority may be based on the layer 1 priority of an SL packet, the layer 2 priority of the SL packet, or a combination of the layer 1 priority and the layer 2 priority of the SL packet. The layer 1 priority of an uplink (or SL) packet may refer to the priority of the uplink (or SL) packet being transmitted among other packets in layer 1 of the wireless communication. The layer 2 priority of an uplink (or SL) packet may refer to the priority of the uplink (or SL) packet being transmitted among other packets in layer 2 of the wireless communication. For example, referring to FIG. 6, when the first UE 602 adjusts, at 624, the uplink communication (612) with the network entity (base station 604), the adjustment may be done based on one or more of: the uplink packet priority at the first UE 602, the SL packet priority for the SL communication (608), the first PDB of an uplink packet at the first UE 602, the quality of service (QoS) of the uplink packet at the first UE 602, the second PDB of an SL packet for the SL communication (608), the QoS of the SL packet for the SL communication (608), or one or more transmission parameters for the SL communication (608).

At 822, the first UE may receive a first beam restriction from the network node or a second UE, or transmit a second beam restriction to the one or more UEs for the SL communication. In some aspects, the beam restriction may be based on an overlap in at least one of time or frequency between uplink resources and SL resources.

For example, referring to FIG. 6, the first UE 602 may receive, at 630, a first beam restriction from the network node (base station 604). In one configuration, the first UE 602 may receive the first beam restriction from the second UE 616. The first UE 602 may transmit, at 632, a second beam restriction to the one or more UEs 606 for the SL communication (608). The beam restriction (i.e., the first beam restriction or the second beam restriction) may be based on an overlap in at least one of time or frequency between uplink resources for uplink communication (612) and SL resources for SL communication (608).

At 824, the first UE may receive, from the network node, a power offset for non-orthogonal multiple access (NOMA) over the SL to reduce interference at the network node. For example, referring to FIG. 6, the first UE 602 may receive, at 630, from the network node (base station 604), a power offset for NOMA over the SL to reduce interference at the network node (base station 604).

At 814, a pathloss constraint may be relaxed based on at least one of: an energy harvesting operation of the first UE, or the transmission, to the network node, of the configuration information for the SL communication. For example, referring to FIG. 6, the first UE 602 may, at 634, relax a pathloss constraint based on at least one of: an energy harvesting operation of the first UE 602, or the transmission, to the network node (base station 604), of the configuration information for the SL communication.

At 816, the switch may be made between pathloss constraints in response to an occurrence of an event. For example, referring to FIG. 6, at 634, the first UE 602 may switch between pathloss constraints in response to an occurrence of an event.

Figure 9:
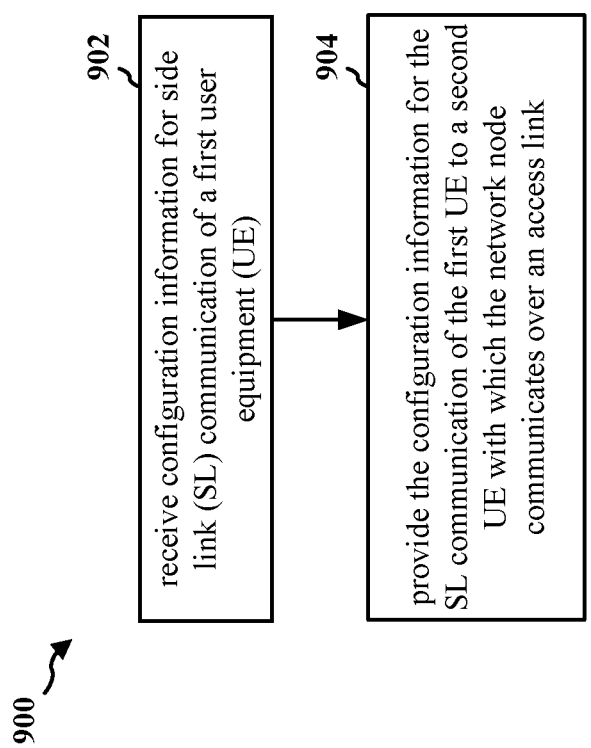
FIG. 9 is the first flowchart illustrating a method of wireless communication at a network entity in accordance with various aspects of the present disclosure.

FIG. 9 is a flowchart 900 illustrating a method of wireless communication at a network entity in accordance with various aspects of the present disclosure. The method may be performed by a network entity. The network entity may be a base station, or a component of a base station, in the access network of FIG. 1 or a core network component (e.g., base station 102, 504, 604, 1306, 1354, 1406, 1454; device 310; or the network entity 1102 in the hardware implementation of FIG. 11). The method enables the adjustment of SL communication between the UEs based on the information of the access link. Thus, it improves the reliability of wireless communication, particularly for XR-related applications, and facilitates the power transfers of energy harvesting UEs.

As shown in FIG. 9, at 902, the network entity may receive configuration information for SL communication of a first UE. The first UE may be the UE 104, 502, 503, 602; device 350; or the apparatus 1104 in the hardware implementation of FIG. 11. FIG. 6 illustrates various aspects of the steps in connection with flowchart 900. For example, referring to FIG. 6, the network entity (base station 604) may receive, at 626, the configuration information for SL communication (608) of a first UE 602.

At 904, the network entity may provide the configuration information for the SL communication of the first UE to a second UE with which the network entity communicates over an access link. For example, referring to FIG. 6, the network entity (base station 604) may provide the configuration information for the SL communication of the first UE 602, which it receives at 626, to the second UE 616. The network entity (base station 604) may communicate with the second UE 616 over an access link. FIG. 13B illustrates an example in which a base station 1354 transmits configuration information for sidelink communication to a UE 1352. FIG. 14B illustrates an example in which the base station 1454 transmits configuration information for the Uu communication of the UE 1452 to the UE 1456.

Figure 10:
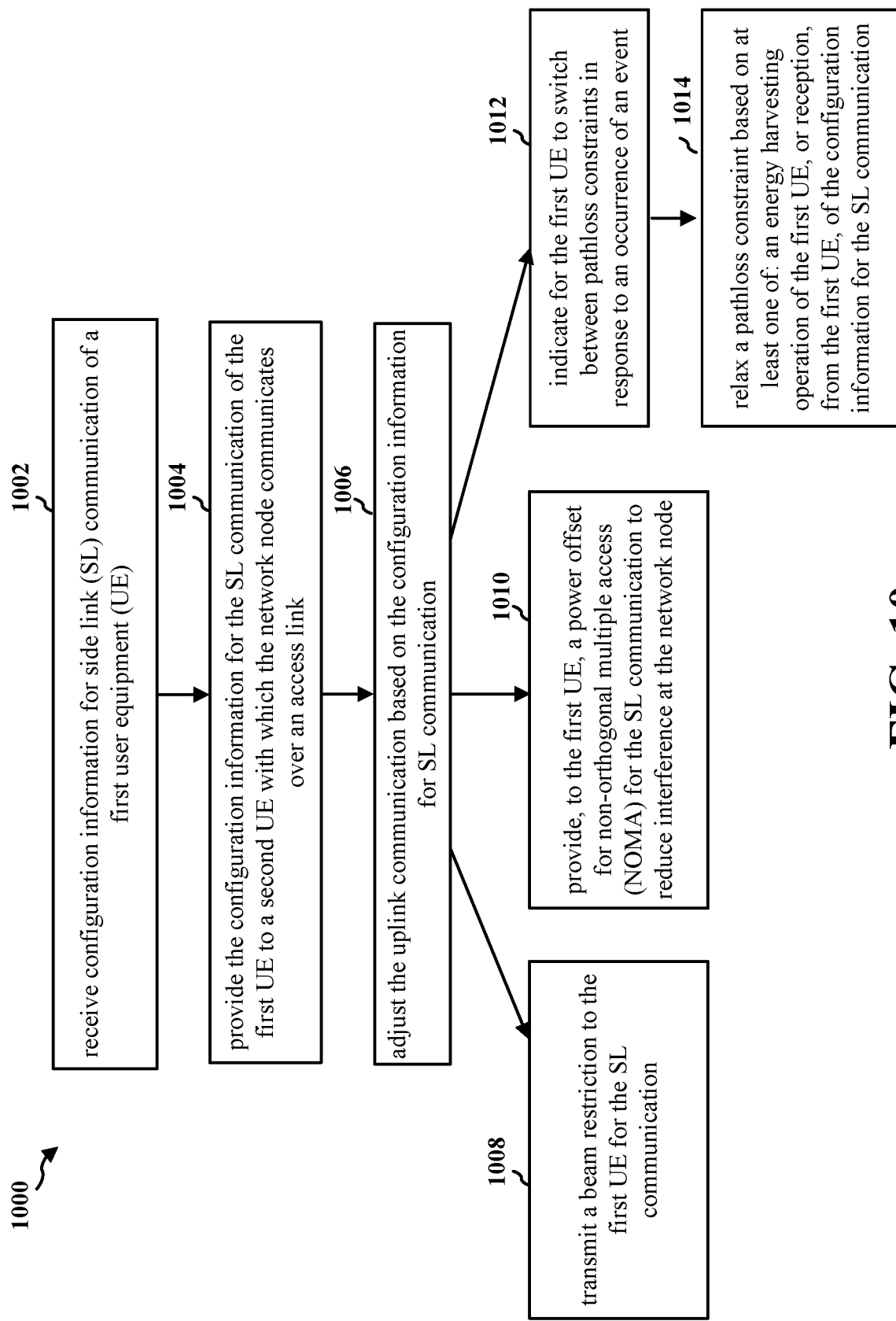
FIG. 10 is the second flowchart illustrating a method of wireless communication at a network entity in accordance with various aspects of the present disclosure.

FIG. 10 is a flowchart 1000 illustrating a method of wireless communication at a network entity in accordance with various aspects of the present disclosure. The method may be performed by a network entity. The network entity may be a base station, or a component of a base station, in the access network of FIG. 1 or a core network component (e.g., base station 102, 504, 604, 1306, 1354, 1406, 1454; device 310; or the network entity 1102 in the hardware implementation of FIG. 11). The method enables the adjustment of SL communication between the UEs based on the information of the access link. Thus, it improves the reliability of wireless communication, particularly for XR-related applications, and facilitates the power transfers of energy harvesting UEs.

As shown in FIG. 10, at 1002, the network entity may receive configuration information for SL communication of a first UE. The first UE may be the UE 104, 502, 503, 602; the device 350; or the apparatus 1104 in the hardware implementation of FIG. 11. FIG. 6 illustrates various aspects of the steps in connection with flowchart 1000. For example, referring to FIG. 6, the network entity (base station 604) may receive, at 626, the configuration information for SL communication (608) of a first UE 602.

At 1004, the network entity may provide the configuration information for the SL communication of the first UE to a second UE with which the network entity communicates over an access link. For example, referring to FIG. 6, the network entity (base station 604) may provide the configuration information for the SL communication of the first UE 602, which it receives at 626, to the second UE 616. The network entity (base station 604) may communicate with the second UE 616 over an access link. FIG. 13B illustrates an example in which a base station 1354 transmits configuration information for sidelink communication to a UE 1352. FIG. 14B illustrates an example in which the base station 1454 transmits configuration information for the Uu communication of the UE 1452 to the UE 1456.

In some aspects, the configuration information for the sidelink communication may include one or more of: the configured grant resource allocation for the SL communication, the power control information for the SL communication, the beam information for the SL communication, the MCS for the SL communication, the data priority indication for the SL communication, or the PDB information for the SL communication. For example, referring to FIG. 6, when the network entity (base station 604) receives, at 626, the configuration information for the SL communication (608), the configuration information may include one or more of: the configured grant resource allocation for the SL communication (608), the power control information for the SL communication (608), the beam information for the SL communication (608), the MCS for the SL communication (608), the data priority indication for the SL communication (608), or the PDB information for the SL communication (608).

At 1006, the network entity may adjust the uplink communication based on the configuration information for the SL communication. The network entity may adjust the uplink communication by adjusting one or more of: the resource used for uplink communication of the second UE, the transmission power of the uplink communication, the MCS of the uplink communication, the transmitted analog beam of the uplink communication, the TPMI of the uplink communication, the rank of the uplink communication, or the beam direction for the uplink communication. For example, referring to FIG. 6, the network entity (base station 604) may adjust the uplink communication (612) based on the configuration information for the SL communication (608), which it receives at 626. The network entity (base station 604) may adjust the uplink communication (612) by adjusting one or more of: the resource used for uplink communication (612) of the second UE 616, the transmission power of the uplink communication (612), the MCS of the uplink communication (612), the transmitted analog beam of the uplink communication (612), the TPMI of the uplink communication, the rank of the uplink communication (612), or the beam direction for the uplink communication (612).

In some aspects, the network entity may adjust the communication with the second UE to reduce interference for SL reception at the first UE or access link communication with the second UE. For example, referring to FIG. 6, the network entity (base station 604) may adjust the communication with the second UE 616 to reduce interference for SL reception at the first UE 602 or access link communication with the second UE 616.

At 1008, the network entity may transmit a beam restriction to the first UE for the SL communication. In some aspects, the beam restriction is based on an overlap in at least one of time or frequency between uplink resources and SL resources. For example, referring to FIG. 6, the network entity (base station 604) may transmit, at 630, a beam restriction (i.e., the first beam restriction) to the first UE 602 for the SL communication (608). In some aspects, the beam restriction (i.e., the first beam restriction) may be based on an overlap in at least one of time or frequency between the uplink resources for the uplink communication (612) and the SL resources for the SL communication (608).

At 1010, the network entity may provide, to the first UE, a power offset for NOMA for the SL communication to reduce interference at the network node. The power offset for the NOMA for the SL communication may be based on the number of UEs using a NOMA allocation. For example, referring to FIG. 6, the network entity (base station 604) may provide, to the first UE 602, a power offset for NOMA for the SL communication (608) to reduce interference at the network node (base station 604). The power offset for the NOMA for the SL communication (608) may be based on the number of UEs using a NOMA allocation.

At 1014, a pathloss constraint may be relaxed based on at least one of: an energy harvesting operation of the first UE, or reception, from the first UE, of the configuration information for the SL communication. For example, referring to FIG. 6, the first UE 602 may, at 634, relax a pathloss constraint based on at least one of: an energy harvesting operation of the first UE 602, or reception, from the first UE 602, of the configuration information for the SL communication (608).

At 1012, the network entity may indicate for the first UE to switch between pathloss constraints in response to an occurrence of an event. For example, referring to FIG. 6, the network entity (base station 604) may indicate for the first UE 602 to switch, at 634, between pathloss constraints in response to an occurrence of an event.

Figure 11:
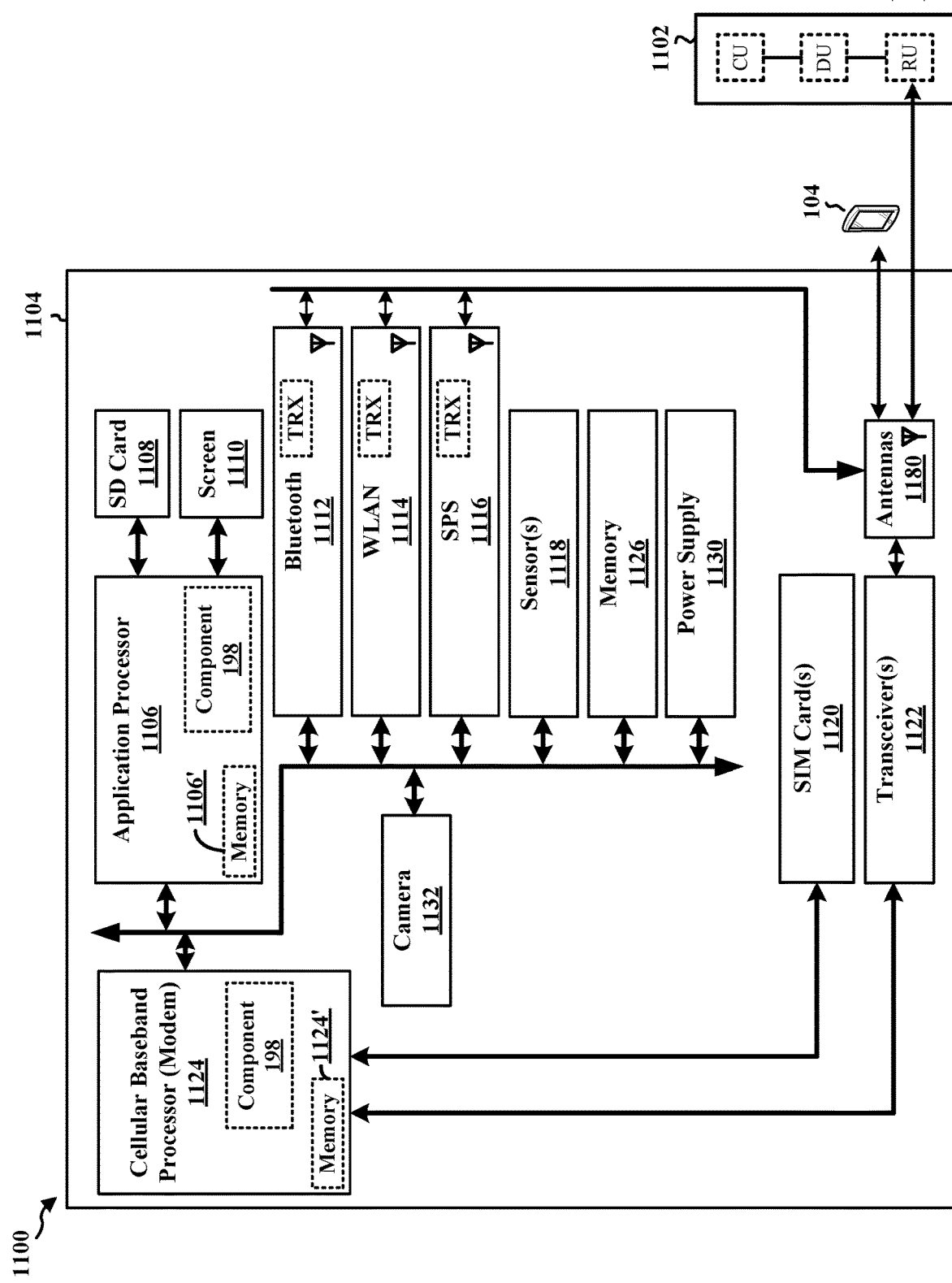
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer (s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the device 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see device 350 of FIG. 3) and include the additional modules of the apparatus 1104.

As discussed supra, the component 198 is configured to communicate with one or more UEs over SL. The component 198 is further configured to transmit or receive configuration information for SL communication with the one or more UEs or uplink communication with a network entity. The component 198 may be further configured to perform any of the aspects described in connection with the flowcharts in FIG. 7, FIG. 8, and/or performed by the UE 602 in FIG. 6. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/ algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for communicating with one or more UEs over SL. The apparatus 1104 may further include means for transmitting or receiving configuration information for SL communication with the one or more UEs or uplink communication with a network entity. The apparatus 1104 may further include means for performing any of the aspects described in connection with the flowcharts in FIGS. 7 and 8, and/or the aspects performed by the UE 602 in FIG. 6. The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
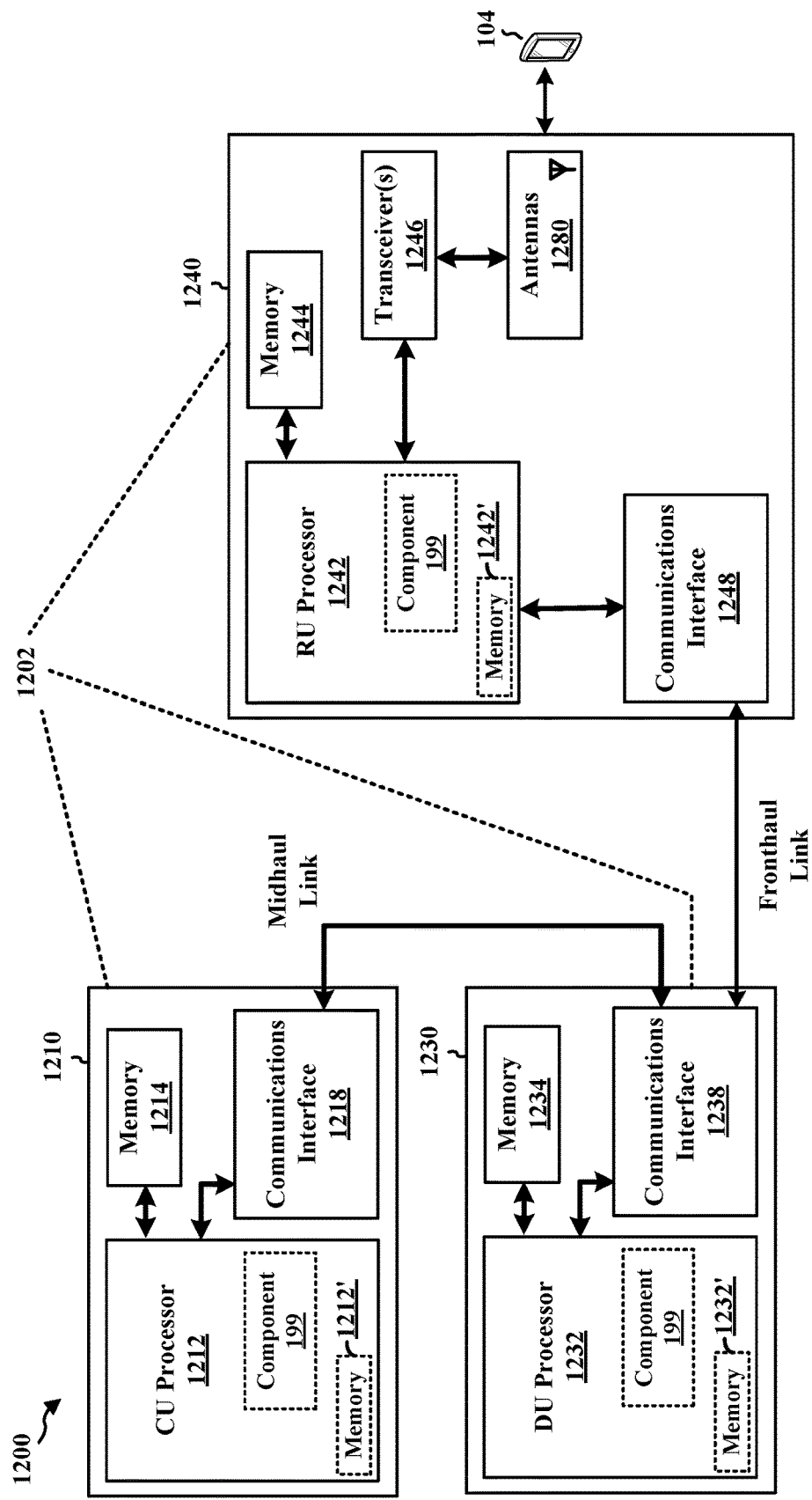
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to receive configuration information for SL communication of a first UE. The component 199 may be further configured to provide the configuration information for the SL communication of the first UE to a second UE with which the network entity communicates over an access link. The component 199 may be further configured to perform any of the aspects described in connection with the flowcharts in FIGS. 9 and 10, and/or performed by the base station 604 in FIG. 6. The component 199 may be within one or more processors of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for receiving configuration information for SL communication of a first UE. The network entity 1202 may further include means for performing any of the aspects described in connection with the flowcharts in FIGS. 9 and 10, and/or the aspects performed by the base station 604 in FIG. 6. The network entity 1202 may further include means for providing the configuration information for the SL communication of the first UE to a second UE with which the network entity communicates over an access link. The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a first UE. The method may include communicate with one or more UEs over SL; and transmit or receive configuration information for SL communication with the one or more UEs or uplink communication with a network entity. The method enables the adjustment of SL communication between the UEs based on the information of the access link. Thus, it improves the reliability of wireless communication, particularly for XR-related applications, and facilitates the power transfers of energy harvesting UEs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims.

The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first UE. The method includes communicating with one or more UEs over SL; and transmitting or receiving configuration information for SL communication with the one or more UEs or uplink communication with a network entity.

Aspect 2 is the method of aspect 1, where the configuration information includes one or more of: a configured grant resource allocation for the SL communication, power control information for the SL communication, beam information for the SL communication, an MCS for the SL communication, a data priority indication for the SL communication, or packet delay budget information for the SL communication.

Aspect 3 is the method of any of aspects 1 and 2, where the method further includes establishing an RRC connection with a second UE that communicates with a network on an access link, and transmitting the configuration information for the SL communication to the second UE in an SL message.

Aspect 4 is the method of any of aspects 1 and 2, where the method further includes establishing an RRC connection with a second UE that communicates with a network on an access link, and receiving, from the second UE or the network entity, resource information for the uplink communication of the second UE.

Aspect 5 is the method of aspect 4, where the method further includes adjusting the SL communication with a third UE based on the resource information for the uplink communication of the second UE.

Aspect 6 is the method of aspect 5, where adjusting the SL communication with the third UE includes: adjusting one or more of: a transmission power of the SL communication, a modulation and coding scheme of the SL communication, or a beam direction for the SL communication.

Aspect 7 is the method of any of aspects 1 to 6, where the method further includes: communicating with the network entity on an access link, receiving the configuration information for the SL communication of the one or more UEs; and adjusting the uplink communication with the network entity based on the configuration information of the SL communication of the one or more UEs.

Aspect 8 is the method of aspect 7, where adjusting the uplink communication with the network entity includes: adjusting one or more of: a resource used for the uplink communication, a transmission power of the uplink communication, an MCS of the uplink communication, a transmitted analog beam of the uplink communication, a TPMI of the uplink communication, a rank of the uplink communication, or a beam direction for the uplink communication.

Aspect 9 is the method of aspect 8, where the method further includes receiving an indication from the network entity to adjust the uplink communication based on the configuration information for the SL communication.

Aspect 10 is the method of aspect 8, where the method further includes adjusting the uplink communication to reduce interference for SL reception at the one or more UEs.

Aspect 11 is the method of aspect 7, where the method includes adjusting the uplink communication with the network entity further based on at least one of: an uplink packet priority at the first UE, where the uplink packet priority is based on a layer 1 priority of an uplink packet, a layer 2 priority of the uplink packet, or a combination of the layer 1 priority and the layer 2 priority of the uplink packet, an SL packet priority for the SL communication, where the SL packet priority is based on a layer 1 priority of an SL packet, a layer 2 priority of the SL packet, or a combination of the layer 1 priority and the layer 2 priority of the SL packet, a first PDB of the uplink packet at the first UE, a QoS of the uplink packet at the first UE, a second PDB of an SL packet for the SL communication, a QoS of the SL packet for the SL communication, or one or more transmission parameters for the SL communication.

Aspect 12 is the method of any of aspects 1 to 11, where the method further includes receiving a first beam restriction from the network entity or a second UE, or transmitting a second beam restriction to the one or more UEs for the SL communication.

Aspect 13 is the method of aspect 12, where the beam restriction is based on an overlap in at least one of time or frequency between uplink resources and SL resources.

Aspect 14 is the method of any of aspects 1 to 13, where the method further includes receiving, from the network entity, a power offset for NOMA over the SL to reduce interference at the network entity.

Aspect 15 is the method of any of aspects 1 to 14, where the method further includes relaxing a pathloss constraint based on at least one of: an energy harvesting operation of the first UE, or the transmission, to the network entity, of the configuration information for the SL communication.

Aspect 16 is the method of aspect 15, where the method further includes switching between pathloss constraints in response to an occurrence of an event.

Aspect 17 is an apparatus for wireless communication at a first UE, including: a memory; and at least one processor coupled to the memory and, based at least in part on information stored in the memory, the at least one processor is configured to perform the method of any of aspects 1-16.

Aspect 18 is the apparatus of aspect 17, further including at least one of a transceiver or an antenna coupled to the at least one processor and configured to transmit or receive the configuration information.

Aspect 19 is an apparatus for wireless communication including means for implementing the method of any of aspects 1-16.

Aspect 20 is a computer-readable medium (e.g., a non-transitory computer-readable medium) storing computer executable code, where the code when executed by a processor causes the processor to implement the method of any of aspects 1-16.

Aspect 21 is a method of wireless communication at a network entity. The method includes receiving configuration information for SL communication of a first user equipment (UE); and providing the configuration information for the SL communication of the first UE to a second UE with which the network entity communicates over an access link.

Aspect 22 is the method of aspect 21, where the configuration information includes one or more of: a configured grant resource allocation for the SL communication, power control information for the SL communication, beam information for the SL communication, an MCS for the SL communication, a data priority indication for the SL communication, or packet delay budget information for the SL communication.

Aspect 23 is the method of any of aspects 21 to 22, where the method further includes adjusting, based on the configuration information for the SL communication, one or more of: a resource used for uplink communication of the second UE, a transmission power of the uplink communication, an MCS of the uplink communication, a transmitted analog beam of the uplink communication, a TPMI of the uplink communication, a rank of the uplink communication, or a beam direction for the uplink communication.

Aspect 24 is the method of aspect 23, where the method further includes adjusting communication with the second UE to reduce interference for SL reception at the first UE or access link communication with the second UE.

Aspect 25 is the method of any of aspects 21 to 24, where the method further includes transmitting a beam restriction to the first UE for the SL communication.

Aspect 26 is the method of aspect 25, where the beam restriction is based on an overlap in at least one of time or frequency between uplink resources and SL resources.

Aspect 27 is the method of any of aspects 21 to 26, where the method further includes providing, to the first UE, a power offset for NOMA for the SL communication to reduce interference at the network entity.

Aspect 28 is the method of aspect 27, where the power offset for the NOMA for the SL communication is based on a number of UEs using a NOMA allocation.

Aspect 29 is the method of any of aspects 21 to 28, where the method further includes relaxing a pathloss constraint based on at least one of: an energy harvesting operation of the first UE, or reception, from the first UE, of the configuration information for the SL communication.

Aspect 30 is the method of aspect 29, where the method further includes indicating for the first UE to switch between pathloss constraints in response to an occurrence of an event.

Aspect 31 is an apparatus for wireless communication at a network entity, including: a memory; and at least one processor coupled to the memory and, based at least in part on information stored in the memory, the at least one processor is configured to perform the method of any of aspects 21-30.

Aspect 31 is the apparatus of aspect 30, further including at least one of a transceiver or an antenna coupled to the at least one processor and configured to receive the configuration information.

Aspect 32 is an apparatus for wireless communication including means for implementing the method of any of aspects 21-30.

Aspect 33 is a computer-readable medium (e.g., a non-transitory computer-readable medium) storing computer executable code, where the code when executed by a processor causes the processor to implement the method of any of aspects 21-30.

What is claimed is:

1. An apparatus for wireless communication at a first user equipment (UE), comprising:
   a memory; and
   at least one processor coupled to the memory and, based at least in part on stored information stored in the memory, the at least one processor is configured to:
   communicate with one or more UEs over side link (SL);
   transmit or receive configuration information for SL communication with the one or more UEs or uplink communication with a network entity; and
   relax a pathloss constraint based on an energy harvesting operation of the first UE.

2. The apparatus of claim 1, wherein the configuration information includes one or more of:
   a configured grant resource allocation for the SL communication,
   power control information for the SL communication,
   beam information for the SL communication,
   a modulation and coding scheme (MCS) for the SL communication,
   a data priority indication for the SL communication, or
   packet delay budget information for the SL communication.

3. The apparatus of claim 1, wherein the at least one processor is configured to:
   establish a radio resource control (RRC) connection with a second UE that communicates with a network on an access link, wherein the at least one processor is configured to transmit the configuration information for the SL communication to the second UE in an SL message.

4. The apparatus of claim 1, wherein the at least one processor is configured to:
   establish a radio resource control (RRC) connection with a second UE that communicates with a network on an access link, wherein the at least one processor is configured to receive, from the second UE or the network entity, resource information for the uplink communication of the second UE.

5. The apparatus of claim 4, wherein the at least one processor is further configured to:
   adjust the SL communication with a third UE based on the resource information for the uplink communication of the second UE.

6. The apparatus of claim 5, wherein to adjust the SL communication with the third UE, the at least one processor is configured to adjust one or more of:
   a transmission power of the SL communication,
   a modulation and coding scheme of the SL communication, or
   a beam direction for the SL communication.

7. The apparatus of claim 1, wherein the at least one processor is further configured to:
   communicate with the network entity on an access link, wherein the at least one processor is configured to receive the configuration information for the SL communication of the one or more UEs; and
   adjust the uplink communication with the network entity based on the configuration information of the SL communication of the one or more UEs.

8. The apparatus of claim 7, wherein to adjust the uplink communication with the network entity, the at least one processor is configured to adjust one or more of:
   a resource used for the uplink communication,
   a transmission power of the uplink communication,
   a modulation and coding scheme (MCS) of the uplink communication,
   a transmitted analog beam of the uplink communication,
   a transmitted precoding matrix indicator (TPMI) of the uplink communication,
   a rank of the uplink communication, or
   a beam direction for the uplink communication.

9. The apparatus of claim 8, wherein the at least one processor is further configured to:

receive an indication from the network entity to adjust the uplink communication based on the configuration information for the SL communication.

10. The apparatus of claim 8, wherein the at least one processor is configured to adjust the uplink communication to reduce interference for SL reception at the one or more UEs.

11. The apparatus of claim 7, wherein the at least one processor is configured to adjust the uplink communication with the network entity further based on at least one of:
an uplink packet priority at the first UE, wherein the uplink packet priority is based on
a layer 1 priority of an uplink packet,
a layer 2 priority of the uplink packet, or
a combination of the layer 1 priority and the layer 2 priority of the uplink packet, an SL packet priority for the SL communication, wherein the SL packet priority is based on
a layer 1 priority of an SL packet,
a layer 2 priority of the SL packet, or
a combination of the layer 1 priority and the layer 2 priority of the SL packet,
a first packet delay budget (PDB) of the uplink packet at the first UE,
a quality of service (QOS) of the uplink packet at the first UE,
a second PDB of the SL packet for the SL communication,
a QoS of the SL packet for the SL communication, or
one or more transmission parameters for the SL communication.

12. The apparatus of claim 1, wherein the at least one processor is further configured to:
receive a first beam restriction from the network entity or a second UE, or
transmit a second beam restriction to the one or more UEs for the SL communication.

13. The apparatus of claim 12, wherein the beam restriction is based on an overlap in at least one of time or frequency between uplink resources and SL resources.

14. The apparatus of claim 1, wherein the at least one processor is further configured to:
receive, from the network entity, a power offset for non-orthogonal multiple access (NOMA) over the SL to reduce interference at the network entity.

15. The apparatus of claim 1, wherein the at least one processor is further configured to:
relax a pathloss constraint based on a transmission, to the network entity, of the configuration information for the SL communication.

16. The apparatus of claim 15, wherein the at least one processor is further configured to:
switch between pathloss constraints in response to an occurrence of an event.

17. The apparatus of claim 1, further comprising:
at least one transceiver coupled to the at least one processor and via which the at least one processor is configured to transmit or receive the configuration information.

18. The apparatus of claim 1, wherein the at least one processor is further configured to:
switch between pathloss constraints in response to an occurrence of an event.

19. An apparatus for wireless communication at a network entity, comprising:

a memory; and
at least one processor coupled to the memory and, based at least in part on stored information stored in the memory, the at least one processor is configured to:
receive configuration information for side link (SL) communication of a first user equipment (UE);
provide the configuration information for the SL communication of the first UE to a second UE with which the network entity communicates over an access link; and
relax a pathloss constraint based on an energy harvesting operation of the first UE.

20. The apparatus of claim 19, wherein the configuration information includes one or more of:
a configured grant resource allocation for the SL communication,
power control information for the SL communication,
beam information for the SL communication,
a modulation and coding scheme (MCS) for the SL communication,
a data priority indication for the SL communication, or
packet delay budget information for the SL communication.

21. The apparatus of claim 19, wherein the at least one processor is configured to adjust, based on the configuration information for the SL communication, one or more of:
a resource used for uplink communication of the second UE,
a transmission power of the uplink communication,
a modulation and coding scheme (MCS) of the uplink communication,
a transmitted analog beam of the uplink communication,
a transmitted precoding matrix indicator (TPMI) of the uplink communication,
a rank of the uplink communication, or a beam direction for the uplink communication.

22. The apparatus of claim 21, wherein the at least one processor is configured to adjust communication with the second UE to reduce interference for SL reception at the first UE or access link communication with the second UE.

23. The apparatus of claim 19, wherein the at least one processor is further configured to:
transmit a beam restriction to the first UE for the SL communication.

24. The apparatus of claim 23, wherein the beam restriction is based on an overlap in at least one of time or frequency between uplink resources and SL resources.

25. The apparatus of claim 19, wherein the at least one processor is further configured to:
provide, to the first UE, a power offset for non-orthogonal multiple access (NOMA) for the SL communication to reduce interference at the network entity.

26. The apparatus of claim 25, wherein the power offset for the NOMA for the SL communication is based on a number of UEs using a NOMA allocation.

27. The apparatus of claim 19, wherein the at least one processor is further configured to:
relax a pathloss constraint based on reception, from the first UE, of the configuration information for the SL communication.

28. The apparatus of claim 27, wherein the at least one processor is further configured to:
indicate for the first UE to switch between pathloss constraints in response to an occurrence of an event.

29. The apparatus of claim 19, further comprising:
at least one transceiver coupled to the at least one processor and via which the at least one processor is configured to receive the configuration information.

30. The apparatus of claim 19, wherein the at least one processor is further configured to:
indicate for the first UE to switch between pathloss constraints in response to an occurrence of an event.

31. A method of wireless communication at a first user equipment (UE), comprising:
communicating with one or more UEs over SL;
transmitting or receiving configuration information for SL communication with the one or more UEs or uplink communication with a network entity; and
relaxing a pathloss constraint based on an energy harvesting operation of the first UE.

32. A method of wireless communication at a network entity, comprising:
receiving configuration information for SL communication of a first user equipment (UE);
providing the configuration information for the SL communication of the first UE to a second UE with which the network entity communicates over an access link; and
relaxing a pathloss constraint based on an energy harvesting operation of the first UE.

* * * * *